US009905061B2

(12) United States Patent
Nagata et al.

(10) Patent No.: US 9,905,061 B2
(45) Date of Patent: Feb. 27, 2018

(54) VEHICLE STATE MONITORING SYSTEM, AND PORTABLE TERMINAL DEVICE

(71) Applicant: HONDA MOTOR CO., LTD., Tokyo (JP)

(72) Inventors: Erito Nagata, Tokyo (JP); Kie Saito, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/038,803

(22) PCT Filed: Nov. 19, 2014

(86) PCT No.: PCT/JP2014/080581
§ 371 (c)(1),
(2) Date: May 24, 2016

(87) PCT Pub. No.: WO2015/076280
PCT Pub. Date: May 28, 2015

(65) Prior Publication Data
US 2016/0379423 A1 Dec. 29, 2016

(30) Foreign Application Priority Data
Nov. 25, 2013 (JP) ................. 2013-242533

(51) Int. Cl.
G07C 5/08 (2006.01)
G07C 5/00 (2006.01)
(Continued)

(52) U.S. Cl.
CPC ........ G07C 5/0825 (2013.01); B60R 16/0234 (2013.01); G07C 5/006 (2013.01); G07C 5/008 (2013.01); H04L 67/12 (2013.01)

(58) Field of Classification Search
CPC ...... G07C 5/0825; G07C 5/006; G07C 5/008; B60R 16/0234; H04L 67/12
See application file for complete search history.

(56) References Cited

U.S. PATENT DOCUMENTS 9,466,155 B2 * 10/2016 Miljkovic ............. G07C 5/008
2008/0316009 A1 12/2008 Nagata
(Continued)

FOREIGN PATENT DOCUMENTS

JP 2002-055715 A 2/2002
JP 2002-302015 A 10/2002
(Continued)

OTHER PUBLICATIONS

Japanese Office Action application No. 2015-549163 dated Nov. 29, 2016.
(Continued)

Primary Examiner — Todd Melton
(74) Attorney, Agent, or Firm — Squire Patton Boggs (US) LLP

(57) ABSTRACT

In a monitoring system, when a warning lamp lights up or blinks, a DA device transmits failure data corresponding to the lighting or blinking to a portable terminal. The portable terminal, when the received failure data indicates renewed lighting or blinking, creates a message corresponding to the failure data and causes a display unit of the DA device to display the message, while transmitting the failure data to a server. Upon termination of reception of the failure data, the portable terminal transmits all of the failure data to the server.

8 Claims, 18 Drawing Sheets

(51) Int. Cl.
*B60R 16/023* (2006.01)
*H04L 29/08* (2006.01)

(56) References Cited

U.S. PATENT DOCUMENTS

| | | | | |
|---|---|---|---|---|
| 2011/0281562 | A1* | 11/2011 | Videtich | H04W 4/046 |
| | | | | 455/414.1 |
| 2013/0246135 | A1* | 9/2013 | Wang | G07C 5/008 |
| | | | | 705/14.4 |
| 2014/0073254 | A1 | 3/2014 | Ichihara et al. | |
| 2015/0127210 | A1 | 5/2015 | Suzuki | |

FOREIGN PATENT DOCUMENTS

| | | | |
|---|---|---|---|
| JP | 2002293165 | A | 10/2002 |
| JP | 2002331884 | A | 11/2002 |
| JP | 2004330899 | A | 11/2004 |
| JP | 2006-193138 | A | 7/2006 |
| WO | 2012/160668 | A1 | 11/2012 |
| WO | 2013/171898 | A1 | 11/2013 |

OTHER PUBLICATIONS

International Search Report & Written Opinion dated Feb. 10, 2015 corresponding to International Patent Application No. PCT/JP2014/080581 and English translation thereof.

* cited by examiner

FIG. 13

BRAKE SYSTEM WARNING LAMP — 130

Illumination of this lamp during driving implies that you should please immediately have an inspection performed at the dealer. Further, even if illuminated, the performance of the normal braking function is preserved. When the City Brake Active indicator lamp is illuminated simultaneously, the City Brake Active System is failing — 128

Emergency — 106

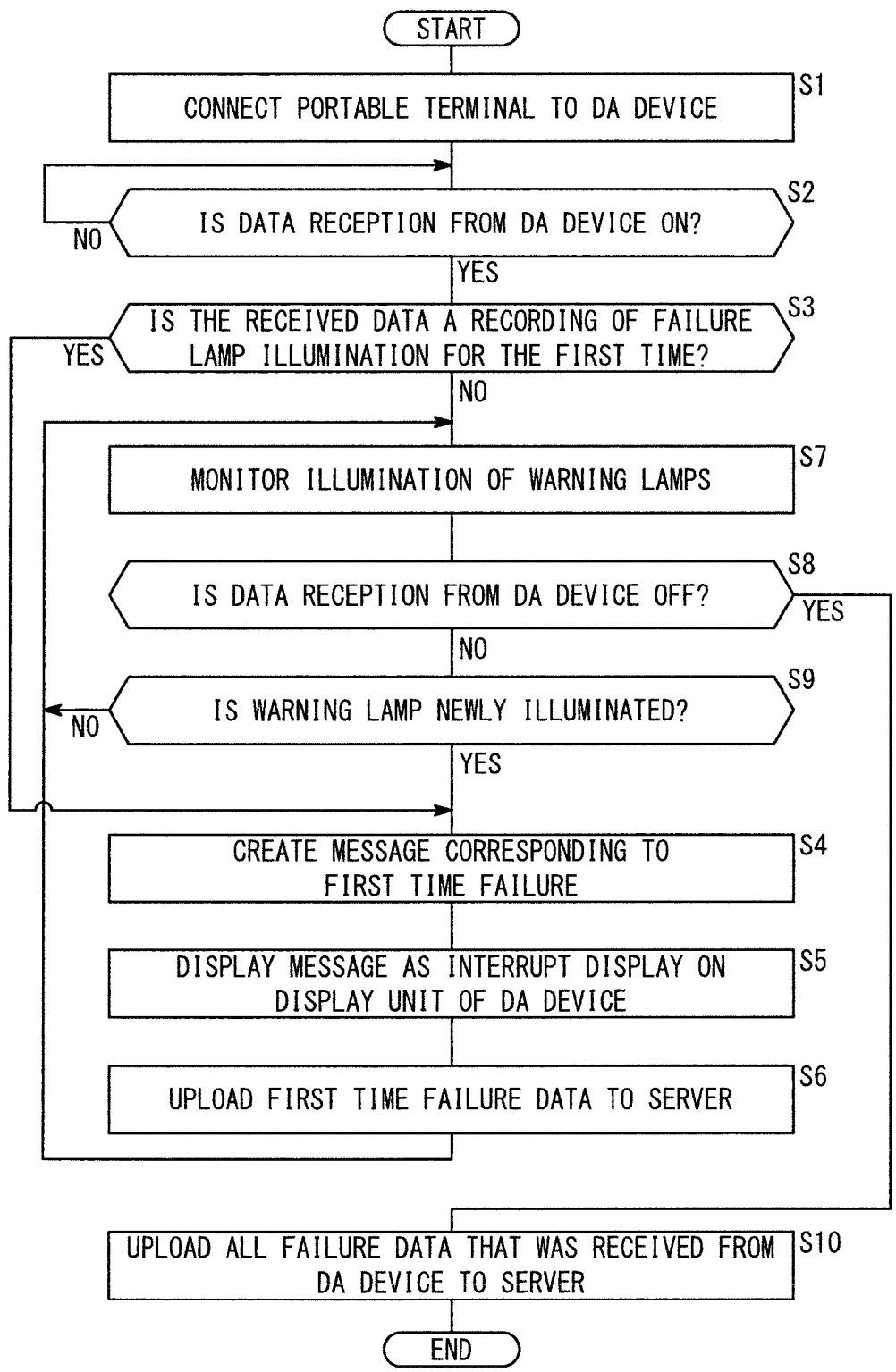

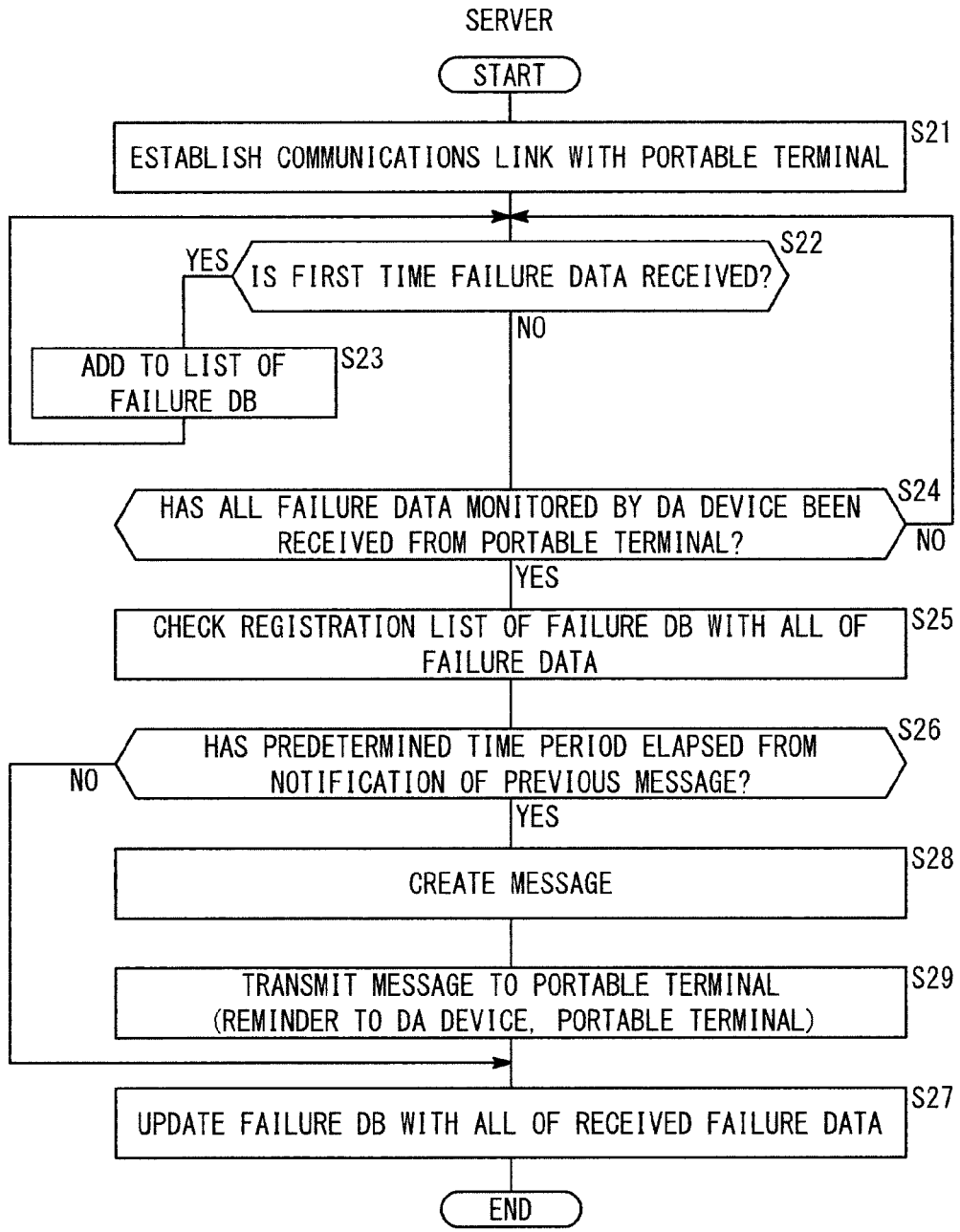

VEHICLE STATE MONITORING SYSTEM, AND PORTABLE TERMINAL DEVICE

TECHNICAL FIELD

The present invention relates to a vehicle state monitoring system, which, in the case that a warning lamp is illuminated or undergoes flashing in accordance with the occurrence of an abnormal state of failure or poor maintenance of the vehicle or the like, notifies a vehicle user (driver) of the warning content along with a method for resolving the same responsive to the illumination or flashing, and further, monitors whether or not the abnormal state of the vehicle continues. Further, the present invention relates to a portable terminal device that is applied to such a monitoring system.

BACKGROUND ART

Conventionally, when an abnormal state of failure or poor maintenance or the like of a vehicle occurs, a failure code (DTC: Diagnostic Trouble Code) is recorded in an ECU (Electronic Control Unit) in the vehicle, together with causing various warning lamps provided in the vehicle to become illuminated or undergo flashing, whereby the occurrence of the abnormal state is notified to the driver.

Accordingly, in the case that a warning lamp is illuminated or undergoes flashing during driving of the vehicle, the driver can recognize that the abnormal state is occurring. However, for a driver who is not familiar with the warning lamp, it cannot be understood what kind of abnormal condition is implied by the illumination or flashing of the warning lamp, and it is impossible to undertake an appropriate action in response thereto.

With respect to this type of problem, in Japanese Laid-Open Patent Publication No. 2006-193138, when a warning lamp is illuminated or undergoes flashing, it is disclosed to notify a driver of detailed information in relation to the illumination or flashing of the warning lamp, by displaying the detailed information on a display device as a notification means.

More specifically, a contents description database, which is capable of storing data (detailed information) in relation to descriptive content of warnings by illumination or flashing of the warning lamps, is provided in advance in both a server system and a navigation device that is mounted in the vehicle. In addition, when a warning lamp is illuminated or undergoes flashing, the navigation device searches as to whether or not detailed information corresponding to the warning lamp is stored in its own contents description database, and if detailed information is stored therein, such detailed information is used and notified to the driver.

On the other hand, in the case that this type of detailed information is not stored therein, the navigation device establishes a communications link with the server system, receives the detailed information from the server system responsive to the concerned warning lamp, and causes the detailed information to be notified to the driver from a display device.

SUMMARY OF INVENTION

However, with the technique of Japanese Laid-Open Patent Publication No. 2006-193138, the contents description database in which the detailed information is stored, and software for searching for the relevant detailed information must be stored beforehand in the navigation device which is a vehicle-mounted device. Therefore, complexity of the system configuration including the vehicle-mounted device cannot be avoided, and in the case that repairs to the system are needed, considerable time and effort are required. Further, in the case that the server system is used, depending on the communications environment, time may be required for accessing the server system, or in certain cases, access may be impossible as a result of being outside of the communications range.

Furthermore, from the time at which the warning lamp is illuminated or starts flashing, in the case that monitoring of the vehicle continues to take place until a repair of a failure or the like corresponding to the lamp illumination or flashing is performed, if the driver continues to be notified of the detailed information with each driving cycle, depending on the driver, there is a possibility that the driver may feel quite annoyed due to being informed continuously. Thus, there is a problem in that, if the notification is carried out such that the relevant detailed information is made less conspicuous, sufficient attention may not be drawn to such information.

The present invention has been devised taking into consideration the aforementioned problems, and has the object of providing a vehicle state monitoring system and a portable terminal device which, in the case that a warning lamp is illuminated or undergoes flashing in accordance with the occurrence of an abnormal state of the vehicle, creates a message corresponding to the abnormality content of the vehicle using the portable terminal device such as a smart phone or the like, which is capable of being connected to a display device mounted in the vehicle, and carrying out notification of the message with respect to the display device inside the vehicle and notification of the abnormality content with respect to a server, whereby the time required for accessing the server can be reduced, and even if the vehicle resides at a position outside of the communications range with respect to the server, it is possible for the message of the abnormality content corresponding to the illumination or flashing of the warning lamp to be notified quickly to the user (driver) of the vehicle.

The present invention relates to a vehicle state monitoring system which is constituted by a display device that is mounted in the vehicle, a portable terminal device configured to be connected to the display device, and a server configured to be connected to the display device through the portable terminal device. Further, the present invention relates to a portable terminal device that is applied to such a monitoring system.

In addition, in the present invention, in the case that an illuminated state or a flashing state of a warning lamp provided in the vehicle is monitored, and the warning lamp is illuminated or undergoes flashing corresponding to an abnormal state that has occurred in the vehicle, if the display device and the portable terminal device are connected, the display device transmits monitoring data indicative of a monitoring result with respect to the warning lamp, to the portable terminal device.

Further, when it is detected that the received monitoring data is a monitoring result indicative of a new illumination or flashing of the warning lamp, the portable terminal device creates a message corresponding to an abnormality content of the vehicle corresponding to the new illumination or flashing, notifies the display device of the message, and causes the message to be displayed on the display device, and on the other hand, notifies the server of the concerned abnormality content.

In this manner, according to the present invention, when the warning lamp is newly illuminated or undergoes flashing, since the portable terminal device that is connected to the display device creates a message responsive to the abnormality content and displays the message on the display device, the communications time with the server (time to access the server) can be reduced, and it is possible to provide a notification of the concerned message quickly to the driver, even in the event that the vehicle resides at a position outside of the communications range with respect to the server.

In this case, if the warning lamp is newly illuminated or undergoes flashing when the display device and the portable terminal device are not connected, then at a timing at which the portable terminal device is connected to the display device, and receives monitoring data indicative of a new illumination or flashing of the warning lamp, the portable terminal device may notify the server of abnormality content responsive to the new illumination or flashing, while on the other hand, may create a message corresponding to the abnormality content, notify the display device of the message, and cause the message to be displayed on the display device.

In accordance with this feature, during driving of the vehicle, at whatever timing the driver connects the portable terminal device to the display device, with respect to the occurrence of an abnormality condition responsive to a new illumination or flashing of the warning lamp that has occurred during driving in an unconnected condition, at a timing at which the connection between the display device and the portable terminal device is confirmed, the abnormality content responsive to the illumination or flashing can be notified to the server through the portable terminal device from the display device, and together therewith, a message corresponding to the abnormality content can be notified to the driver.

Furthermore, at a point in time when it is detected that reception of the monitoring data has been interrupted, for example, at a timing at which the ignition switch is turned off, or at a timing at which the connection (communications connection) between the display device and the portable terminal device is severed, the portable terminal device transmits to the server the abnormality content responsive to all of the detected monitoring data (failure data pertaining to all of the warning lamps that are illuminated or flashing).

By this feature, since the server receives all of the abnormality content from the portable terminal device, it can easily be managed whether or not the abnormal condition of the same failure or the like is continuing to occur. On the other hand, it is possible to reduce the frequency with which the portable terminal device uploads the failure data defined by the abnormality content to the server. For example, upon driving of the vehicle one time (i.e., during one driving cycle), the portable terminal device only has to carry out, with respect to the server, one time uploading (uploading of all of the failure data) at a point in time that reception of the monitoring data is interrupted, and uploading for each time that a new failure is generated.

In this manner, with the present invention, even if the connection between the display device and the portable terminal device is severed before the ignition switch is turned off, since the portable terminal device transmits to the server all of the failure data at a timing that such severing takes place, the abnormal state of the vehicle at that point in time can be uploaded reliably to the server. Consequently, in the case that the portable terminal device such as a smart phone or the like that is carried on a daily basis by the driver, for example, is carried into the vehicle from the outside and is used as the portable terminal device of the monitoring system, even if connection or disconnection thereof with respect to the display device in the interior of the vehicle is carried out at an arbitrary timing (e.g., the portable terminal device is attached or removed with respect to the display device by the driver), the abnormal state of the vehicle can be uploaded reliably to the server without any problems.

Further, since there is no need for the failure data to be retained in the portable terminal device after transmission thereof, the retained data can be held to a minimum, and it is possible to conserve the memory capacity.

Furthermore, in the case that the abnormality content is notified to the server even though a predetermined time period has elapsed from notification of the abnormality content responsive to the new illumination or flashing, the server preferably transmits, to the portable terminal device, a signal to prompt repair of a failure of the vehicle responsive to the abnormality content. In this case, the portable terminal device, based on the signal received thereby, may display a message to prompt repair of the failure of the vehicle on at least one of a display unit of the portable terminal device, and the display device that is in a connected state.

In this manner, determining whether or not the notification of the abnormality content responsive to a new illumination or flashing continues for a predetermined time period is managed on the side of the server, and when notification of the abnormality content is continued even though the predetermined time period has elapsed, the driver is prompted to repair the failure. As a result, a time period, which is of a degree that does not put the driver to annoyance, can be adjusted easily responsive to the abnormality content.

As has been described above, according to the present invention, in the case that a warning lamp is illuminated or undergoes flashing in accordance with the occurrence of an abnormal state of the vehicle, the portable terminal device such as a smart phone or the like, which is capable of being connected to a display device mounted in the vehicle, is used to create a message corresponding to the abnormality content of the vehicle and further to carry out notification of the message with respect to the display device inside the vehicle and notification of the abnormality content with respect to a server, whereby the time required for accessing the server can be reduced. Further, even if the vehicle resides at a position outside of the communications range with respect to the server, it is possible for the message of the abnormality content responsive to the illumination or flashing of the warning lamp to be notified quickly to the driver.

BRIEF DESCRIPTION OF DRAWINGS

FIG. 13 is an explanatory diagram of another details screen that is displayed on the display unit of the DA device;

FIG. 17 is a flowchart showing operations of the vehicle and the portable terminal; and FIG. 18 is a flowchart showing operations of the server.

DESCRIPTION OF EMBODIMENTS

Configuration of the Present Embodiment

Preferred embodiments concerning a vehicle state monitoring system, and a portable terminal device that is applied to such a monitoring system, according to the present invention, will be presented and described in detail below with reference to the accompanying drawings.

Figure 1:
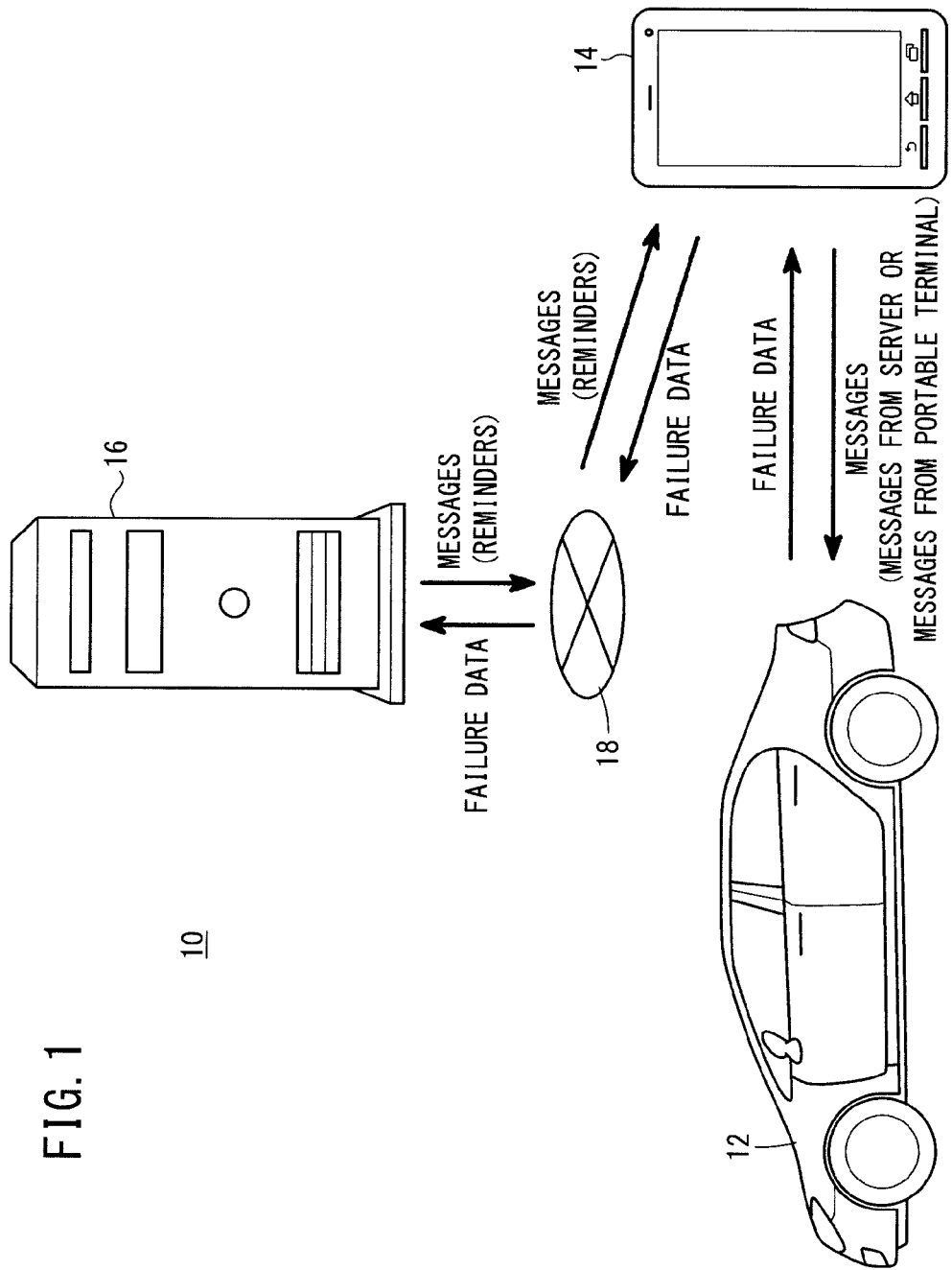
FIG. 1 is an explanatory diagram showing an outline configuration of a vehicle state monitoring system according to a present embodiment.

The vehicle state monitoring system 10 according to the present embodiment (hereinafter also referred to as a monitoring system 10 according to the present embodiment), as shown schematically in FIG. 1, includes a vehicle 12, a portable terminal (portable terminal device) 14, and a server 16.

As the vehicle 12, there can be applied, for example, a four-wheeled vehicle, a two-wheeled vehicle, a mobility scooter, and an electric wheelchair. In FIG. 1, a sedan type of four-wheeled vehicle is illustrated. Further, as the four-wheeled vehicle, there can be applied various types of four-wheeled vehicles such as a sedan, a minivan, a van, and a wagon, etc.

As the portable terminal 14, there can be applied various portable types of information communications equipment, for example, a portable telephone including a smart phone, a portable information terminal (PDA), a tablet terminal, a laptop computer, and a wearable computer. In FIG. 1, a smart phone is illustrated. More specifically, the portable terminal 14 is a portable terminal device such as a smart phone or the like that is carried by the driver on a daily basis, and for example, by the driver carrying the portable terminal 14 from the outside into the interior of the vehicle 12 and riding therein, the portable terminal 14 can be used as a portable terminal device of the monitoring system 10.

Further, in the monitoring system 10, the vehicle 12 and the portable terminal 14 are capable of being connected together wirelessly or over wires, together with the portable terminal 14 and the server 16 being connected through a wireless communications network 18. Consequently, the vehicle 12 is capable of transmitting and receiving various information by two-way communications with the server 16 through the portable terminal 14 and the wireless communications network 18.

Next, a description will be given with reference to FIGS. 2 through 4 concerning the vehicle 12, the portable terminal 14, and the server 16 that make up the monitoring system 10.

Figure 2:
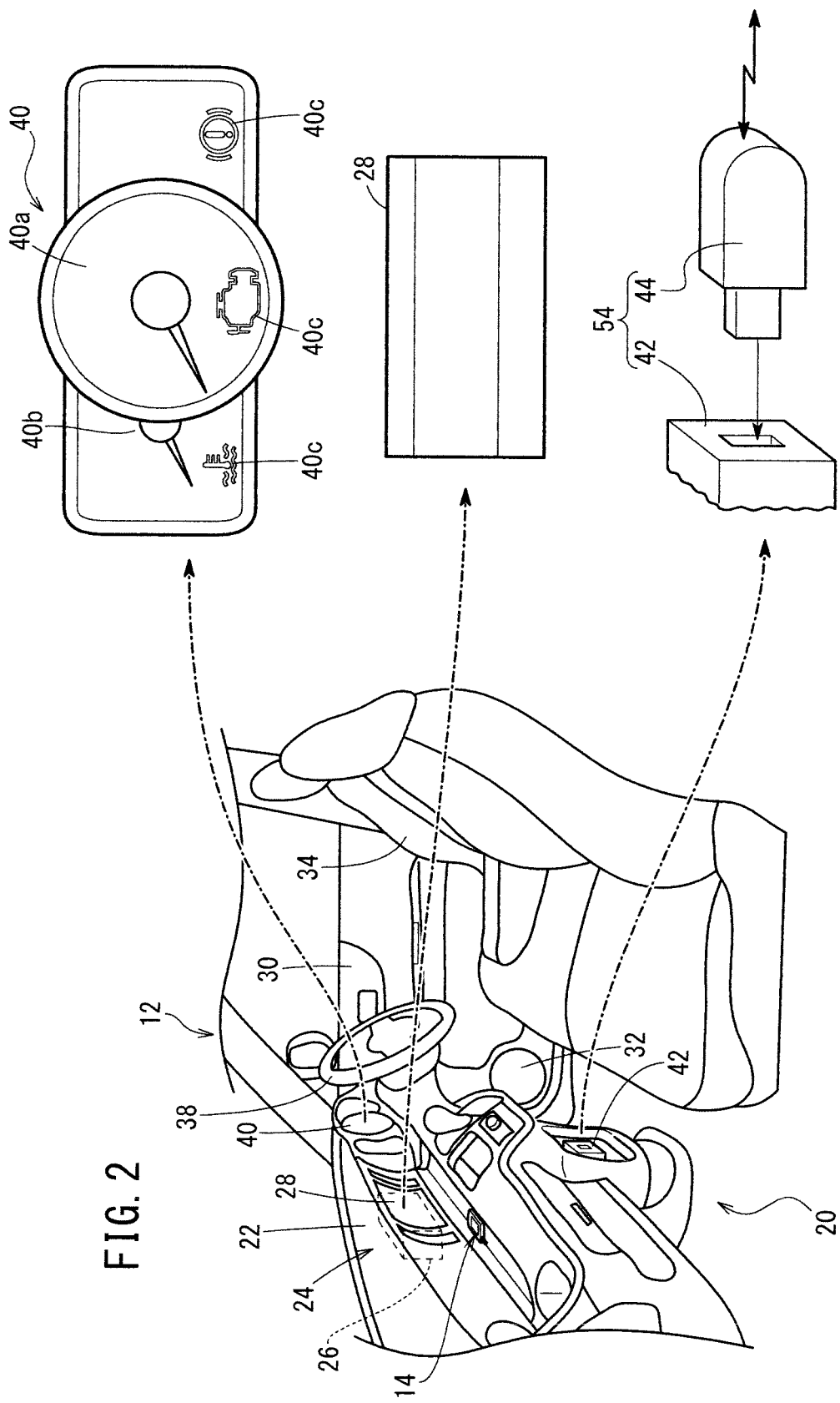
FIG. 2 is a partial perspective view in the interior of a vehicle compartment showing a state in which a portable terminal, a DA device, and a meter panel are arranged in the interior of the vehicle compartment.

As shown in FIG. 2, in the interior of a vehicle compartment 20 of the vehicle 12, substantially in the center in a widthwise direction of a dashboard 22, a display and audio device 24 (hereinafter also referred to as a DA device 24), which functions as a display device, is arranged. The DA device 24 includes a main body section 26, a touch panel 28 that is attached to a screen of the main body section 26 that faces toward the vehicle compartment interior, and speakers 32 that are mounted on a kick panel or the like on both sides of front doors 30. The touch panel 28 is configured so as to carry out touch operations or the like of a driver who is seated in a driver's seat 34, and as shown in FIG. 3, includes a display unit 28a that displays various image information, and an input unit 28b that reflects the operations of the driver that are carried out on the display unit 28a. Moreover, inside the main body section 26, a DA ECU 36 is mounted, which controls the DA device 24 in its entirety.

On the right side in the widthwise direction of the dashboard 22, a meter panel 40 is arranged in front of the driver's seat 34 and a steering wheel 38. The meter panel 40, for example, includes a centrally arranged speedometer 40a, a tachometer 40b arranged on a left side, and a plurality of warning lamps 40c each of which is illuminated or undergoes flashing in order to warn the driver of an abnormal state representing a failure or poor maintenance or the like of the vehicle 12.

In FIG. 2, in order to facilitate description thereof, an actual meter panel 40 is shown in a distorted manner. More specifically, on the meter panel 40, in addition to the speedometer 40a and the tachometer 40b, there are arranged by way of example, respectively, an FI (Fuel Injection) warning lamp as a warning lamp 40c disposed on a lower side of the speedometer 40a, a high water temperature warning lamp as a warning lamp 40c that is disposed on a lower side of the tachometer 40b, and a brake system warning lamp as a warning lamp 40c disposed on the right side. Accordingly, in the present embodiment, it is a matter of course that other warning lamps can be provided, in addition to the above-described warning lamps 40c.

A data link connector 42 (hereinafter also referred to as a DLC 42), which is a connector for communications, is disposed in a lower portion of the dashboard 22. A communications adapter 44 is capable of being connected to the DLC 42. The communications adapter 44 can be connected with the portable terminal 14 through a short-range low-power wireless communications function such as Bluetooth (Registered Trademark), Wi-Fi (Registered Trademark), or the like. Consequently, in the case of FIG. 2, the DA device 24 provided in the vehicle 12 is capable of being connected wirelessly with the portable terminal 14 through the DLC 42 and the communications adapter 44.

The vehicle interior equipment and the arrangement thereof shown in FIG. 2 is but one example thereof, and according to the present embodiment, insofar as the DA device 24 and the meter panel 40 are provided, and the portable terminal 14 and the DA device 24 are capable of being interconnected either wirelessly or over wires, any type of vehicle interior equipment and any kind of arrangement may be used. For this reason, instead of the DLC 42 and the communications adapter 44, the DA device 24 may be connected with the portable terminal 14 over wires such as a USB connection cord or the like.

Figure 3:
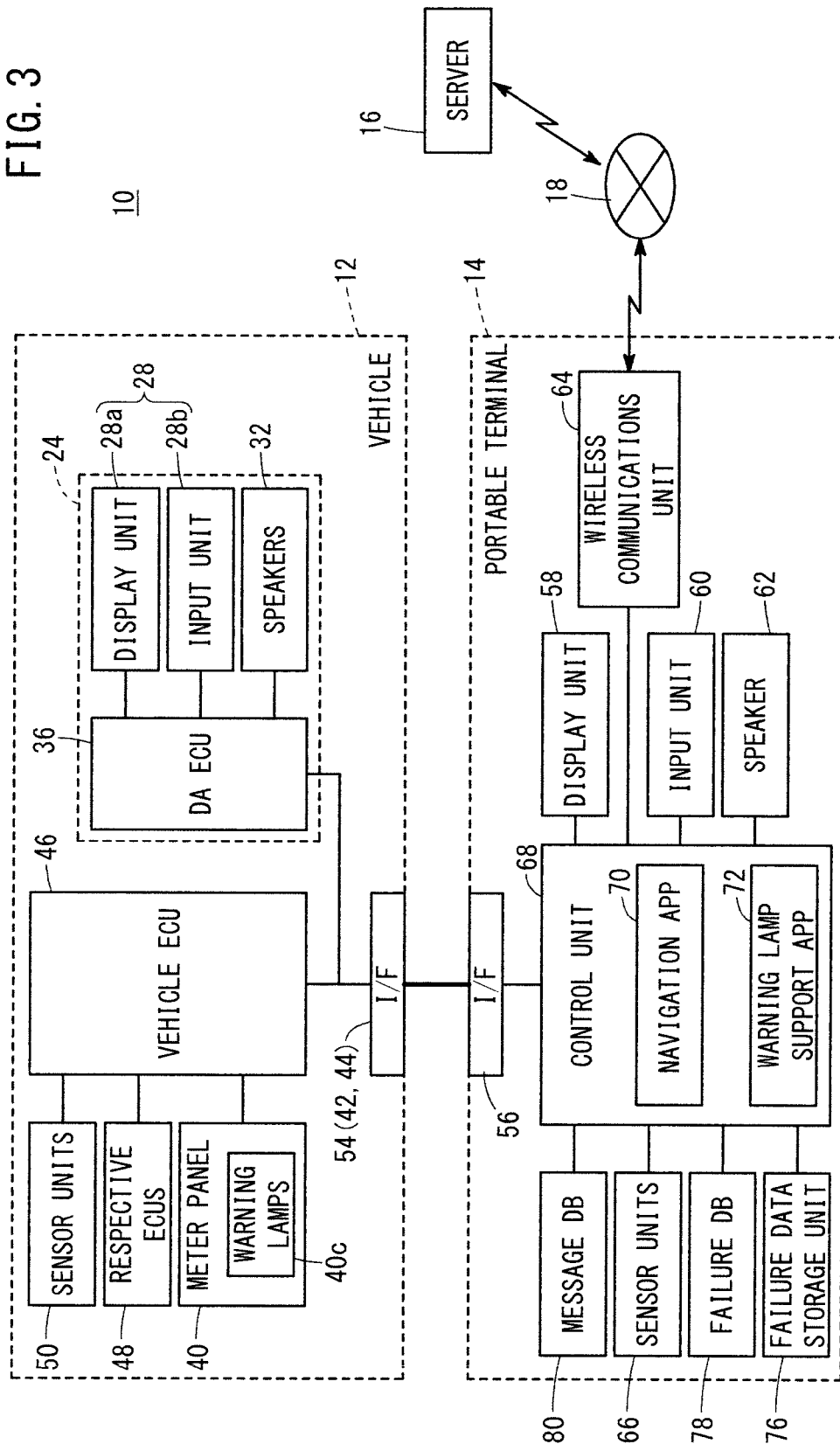
FIG. 3 is a block diagram of the vehicle and the portable terminal shown in FIGS. 1 and 2.

As shown in FIG. 3, in the vehicle 12, in addition to the aforementioned DA device 24 and the meter panel 40, there are further included a vehicle ECU 46 that oversees and controls the vehicle 12 in its entirety, various ECUs 48 that are connected to the vehicle ECU 46, and various sensor units 50.

Among the various ECUs 48, there are included, for example, a steering control ECU, a brake ECU, and a driving force ECU, etc. The steering control ECU controls driving of a steering mechanism of the vehicle 12. The brake ECU controls braking of the respective vehicle wheels independently, and controls the behavior of the vehicle 12, including stopping thereof. The driving force ECU controls driving of an engine and/or a driving motor, and through a transmission or directly, imparts rotational driving forces to the front wheels and/or the rear wheels of the vehicle 12, and performs a control to cause traveling of the vehicle 12.

As the various sensor units 50 that detect and output the vehicle states of various components of the vehicle 12, there are provided, for example, a crank angle sensor that detects an angle of rotation of a crankshaft of the engine, an LAF (Linear Air Fuel) sensor that detects a combustion air/fuel ratio inside the engine from an oxygen concentration and an unburned gas concentration within the exhaust gas, a brake switch that detects stoppage of the vehicle 12, wheel velocity sensors that detect the vehicle velocity, and a water temperature sensor that detects the temperature of a cooling water. Accordingly, in FIG. 3, the various sensors that are capable of detecting the vehicle state of the vehicle 12, including the sensors noted above, are illustrated collectively by the term "sensor units 50".

Based on the detection results of the sensor units 50, and by executing a program that is stored in a non-illustrated storage unit, the vehicle ECU 46 determines whether or not an abnormal state is occurring such as a failure or poor maintenance in the vehicle 12. If the vehicle ECU 46 determines that an abnormal state is occurring, the vehicle ECU 46 outputs a control signal to the meter panel 40 responsive to the determination result, and causes a warning lamp 40c corresponding to the abnormal state responsive to the control signal to be illuminated or undergo flashing. At this time, in a failure code (DTC) corresponding to the determined abnormal state, the vehicle ECU 46 creates failure data to which a determination time (time stamp) is added, and the created failure data is output to the DA device 24.

For example, based on a crank angle that is detected by the crank angle sensor (sensor unit 50), the vehicle ECU 46 determines the presence or absence of misfiring in the respective cylinders of the engine, and when it is determined that a misfiring state is occurring, the FI warning lamp (warning lamp 40c) is made to flash. Further, based on the combustion air/fuel ratio that is detected by the LAF sensor (sensor unit 50), in the case that the vehicle ECU 46 determines that an abnormality has occurred in the exhaust gas control system of the engine, the FI warning lamp is illuminated.

Further, based on the presence or absence of stoppage of the vehicle 12 as detected by the brake switch (sensor unit 50), or based on the vehicle velocity detected by the wheel velocity sensors (sensor unit 50), the vehicle ECU 46 determines whether or not an abnormality in the brake switch or the ABS (Antilock Brake System) has occurred, and in the case that it determines that an abnormality has occurred, the brake switch warning lamp (warning lamp 40c) is illuminated.

Furthermore, in the case that the cooling water temperature detected by the water temperature sensor (sensor unit 50) has exceeded a predetermined first temperature, the vehicle ECU 46 causes the high water temperature warning lamp (warning lamp 40c) to flash, and in the case that the cooling water temperature has exceeded a second temperature that is higher than the first temperature, the high water temperature warning lamp is illuminated.

Further still, based on the vehicle velocity detected by the wheel velocity sensor, the vehicle ECU 46 calculates the running distance of the vehicle 12 within a predetermined time period, and from valve opening information of an injector within a predetermined time period, calculates the fuel consumption amount within the predetermined time period, and further calculates the fuel efficiency of the vehicle 12 from the aforementioned fuel consumption amount and the running distance.

In the case that failure data is input thereto from the vehicle ECU 46, by executing a program that is stored in a non-illustrated storage unit, the DA ECU 36 determines that an abnormal state is occurring such as a failure or poor maintenance in the vehicle 12, and determines that a warning lamp 40c corresponding to the abnormal state is illuminated or undergoing flashing, and further transmits (uploads) the failure data (monitoring data) to the portable terminal 14 through an interface 54 (hereinafter also referred to as an I/F 54) including the DLC 42 and the communications adapter 44. Further, the DA ECU 36 also uploads, to the portable terminal 14, fuel efficiency data of the vehicle 12 as calculated by the vehicle ECU 46.

Moreover, the vehicle ECU 46 carries out the determination of the aforementioned abnormal state at predetermined time intervals, and the DA ECU 36 monitors at predetermined time intervals the presence or absence of inputting of the failure data. Therefore, in the case that the vehicle ECU 46 determines that an abnormal state is occurring in each of respective determination processes, so that illumination or flashing of the warning lamp 40c continues (i.e., in the case that outputting of the failure data continues), the DA ECU 36 continues to transmit the failure data with respect to the portable terminal 14 at predetermined time intervals until the abnormal state is eliminated and the warning lamp 40c is extinguished.

The portable terminal 14 includes an I/F 56 that is capable of being connected wirelessly or over wires with the I/F 54 of the vehicle 12, a display unit 58 and an input unit 60 that constitute a touch panel, a speaker 62 that outputs sounds such as a guidance voice and sound effects, etc., a wireless communications unit 64 capable of connecting to the server 16 through the wireless communications network 18, various sensor units 66, and a control unit 68.

The control unit 68 is a computer and operates as each of various functional units by a CPU (Central Processing Unit) thereof executing programs that are stored in a storage unit.

As programs that are stored in the portable terminal 14, in addition to basic applications (basic apps) such as a telephone function (including a phone-call function and a data communications function by telephone), a short-range low-power wireless communications function such as Bluetooth (Registered Trademark), Wi-Fi (Registered Trademark), or the like, and a hands-free phone-call function using the short-range low-power wireless communications function, etc., there are included a navigation app 70 and a warning lamp support app 72. The navigation app 70 and the warning lamp support app 72 are selected and downloaded by the user to the portable terminal 14, through a mobile communications network-public communications network from a non-illustrated web server that serves as an application download supply source, and the apps are stored in the control unit 68. Alternatively, in the same manner as the basic applications, such apps may be installed in the portable terminal 14 at a time of product shipment, or may be provided as a service part via an electronic medium such as a DVD or the like.

In the portable terminal 14, a failure data storage unit 76, a failure database 78 (hereinafter also referred to as a failure DB 78), and a message database 80 (hereinafter also referred to as a message DB 80) are connected to the control unit 68.

In this case, by the driver operating the input unit 60 and initiating the warning lamp support app 72, the control unit 68 performs a process of transmitting the failure data, to be discussed below, a process of creating messages therefor, and a process of transmitting and displaying the messages.

More specifically, in the case that the portable terminal 14 has received failure data and the fuel efficiency data from the DA ECU 36 through the I/F 54 and the I/F 56, the control unit 68 stores the received failure data and fuel efficiency data in the failure data storage unit 76. Further, if the failure data stored in the failure data storage unit 76 is failure data indicative of a new illumination or flashing of the warning lamps 40c, the control unit 68 stores, in the failure DB 78, such failure data indicative of the new illumination or flashing as first-time failure data corresponding to a newly occurring abnormal state.

In the failure DB 78, a list is stored in which there can be registered DTCs responsive to the newly generated abnormal state, and determination times for the determinations of the vehicle ECU 46. If the failure data stored in the failure data storage unit 76 is not yet registered in the list, the control unit 68 determines that the concerned failure data is new failure data, and registers the DTC included in the new failure data and time information therefor in the list.

Messages that correspond to the abnormal state (DTC) that is assumed to be occurring in the vehicle 12 are stored in the message DB 80. The concerned messages are messages for the purpose of explaining in an easily understandable manner the countermeasures to be taken by the driver, in the case that the warning lamps 40c are illuminated or undergo flashing corresponding to the occurrence of an abnormal state.

Although the messages that are stored in the message DB 80 may only be messages that correspond to the abnormal state (DTC) associated with illumination or flashing of the warning lamps 40c, messages may be included that correspond to all of the abnormal states including abnormal states (DTC) that do not necessarily lead to illumination or flashing of the warning lamps 40c. In this case, in message displays concerning the abnormal states, to be described later, it is possible for message displays to be made of abnormal states for which the warning lamps 40c are not operated.

When the failure data is registered for the first time in the list of the failure DB 78, the control unit 68 searches the message DB 80 for a message corresponding to the failure data concerned, and the retrieved message is displayed on the display unit 28a of the DA device 24 through the I/F 56 and the I/F 54. Further, it is a matter of course that the control unit 68 may display the same message on the display unit 58.

Furthermore, the control unit 68 transmits (uploads) the first time failure data (abnormality content) from the wireless communications unit 64 to the server 16 through the wireless communications network 18.

Furthermore, in a case that the communications connection between the portable terminal 14 and the DA device 24 is interrupted and consequently the failure data cannot be received, the control unit 68 transmits (uploads), in a mass, the failure data that is stored in the failure data storage unit 76 from the wireless communications unit 64 to the server 16 through the wireless communications network 18. At this time, the control unit 68 may also upload to the server 16 all of the failure data, together with the fuel efficiency data (fuel efficiency log data) of the vehicle 12 that is accumulated in the failure data storage unit 76.

In this case, since all of the data that is stored in the failure data storage unit 76 is transmitted to the server 16, after transmission of all of such data, the control unit 68 can delete the data that is stored in the failure data storage unit 76. Further, among the data that is stored in the failure DB 78, by the control unit 68 erasing the data that was not stored in the failure data storage unit 76 during driving at the present time, the fact that a failure corresponding to the erased data has not occurred (the failure state has been resolved and eliminated) is recorded in the failure DB 78.

Incidentally, the case that the communications connection between the portable terminal 14 and the DA device 24 is interrupted and consequently the failure data cannot be received, refers to a case, for example, that, in FIG. 2, the communications adapter 44 is removed from the DLC 42, whereby it becomes impossible to carry out transmission and reception of information wirelessly between the DA device 24 and the portable terminal 14. More specifically, if the driver removes the communications adapter 44 from the DLC 42 at any arbitrary timing, the communications connection between the portable terminal 14 and the DA device 24 is severed.

Further, in the case of a wired connection between the portable terminal 14 and the DA device 24, if the driver removes the communications cable, such as a USB connection cord that connects the portable terminal 14 and the DA device 24, at any arbitrary timing, transmission and reception of information over wires cannot be carried out. Thus, this case is also included in the case that the communications connection between the portable terminal 14 and the DA device 24 is interrupted and consequently the failure data cannot be received.

Further, if the driver turns the ignition switch off, supply of power from the battery to the DA device 24, the vehicle ECU 46, and the sensor unit 50, etc., is suspended, and consequently transmission of failure data and fuel efficiency data from the DA device 24 to the portable terminal 14 cannot be carried out. Thus, in this case as well, the communications connection between the portable terminal 14 and the DA device 24 is severed.

Figure 4:
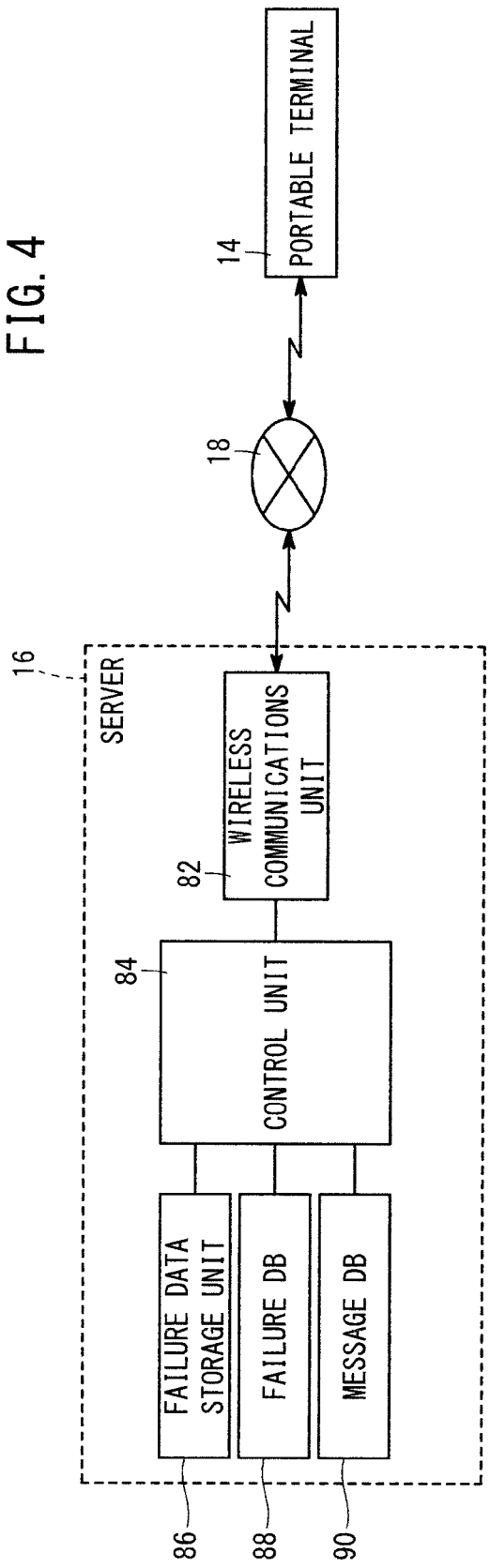
FIG. 4 is a block diagram of a server shown in FIG. 1.

As shown in FIG. 4, the server 16 includes a wireless communications unit 82 capable of being connected to the portable terminal 14 through the wireless communications network 18, a control unit 84 that controls the server 16 comprehensively in its entirety, a failure data storage unit 86 in which there is stored the failure data (abnormality content) and the fuel efficiency data that is received by the wireless communications unit 82 from the portable terminal 14 through the wireless communications network 18, a failure DB 88, which in the same manner as the failure DB 78, comprises a list to which there can be added failure data (abnormality content) responsive to a newly generated failure state, and a message DB 90.

In this case, concerning one item of the abnormality content, in the case that failure data is received continuously from the portable terminal 14, the control unit 84 compares the time appended to the new (initial) failure data that was recorded in the failure DB 88 with the times appended to the failure data that is received continuously. In addition, if a predetermined time period (for example, seven days) has elapsed from the time appended to the initial failure data, the control unit 84 searches the message DB 90 for a message (reminder message) to prompt the driver to repair the failure or the like of the vehicle 12 responsive to the abnormality content concerned. The retrieved message is transmitted to the portable terminal 14 from the wireless communications unit 82 through the wireless communications network 18.

The control unit 68 of the portable terminal 14 displays on the display unit 58 the message that is received (downloaded) by the wireless communications unit 64. Further, in the case that the DA device 24 and the portable terminal 14 are interconnected wirelessly or over wires, the control unit 68 is capable of transmitting the concerned message to the DA device 24, and causing the same to be displayed on the display unit 28a of the touch panel 28.

Moreover, in the case that the driver drives the vehicle 12 on a daily basis, for example, the aforementioned message from the server 16 may be notified after seven days from the initial transmission of the failure data. Further, in the case that the driver drives the vehicle 12 on the order of a few times in a single week or on the order of a few times in a single month, notification thereto may take place at a time when the first driving of the vehicle 12 after seven days have elapsed from the initial transmission of the failure data is completed.

Operations of the Present Embodiment

The monitoring system 10 and the portable terminal 14 according to the present embodiment are configured in the manner described above. Next, operations of the monitoring system 10 and the portable terminal 14 will be described.

At first, occurrence of a failure in the vehicle 12, operations of the portable terminal 14 in response to the occurrence of the failure, and the screen displays on the display unit 28a of the DA device 24 and the display unit 58 of the portable terminal 14 caused by the operations of the portable terminal 14 will be described with reference to FIGS. 5 through 16. Next, descriptions will be made with reference to the flowcharts of FIGS. 17 and 18 concerning overall operations of the monitoring system 10 including the operations mentioned above.

As necessary, in the descriptions of such operations, reference may also be made to FIGS. 1 through 4.

Figure 5:
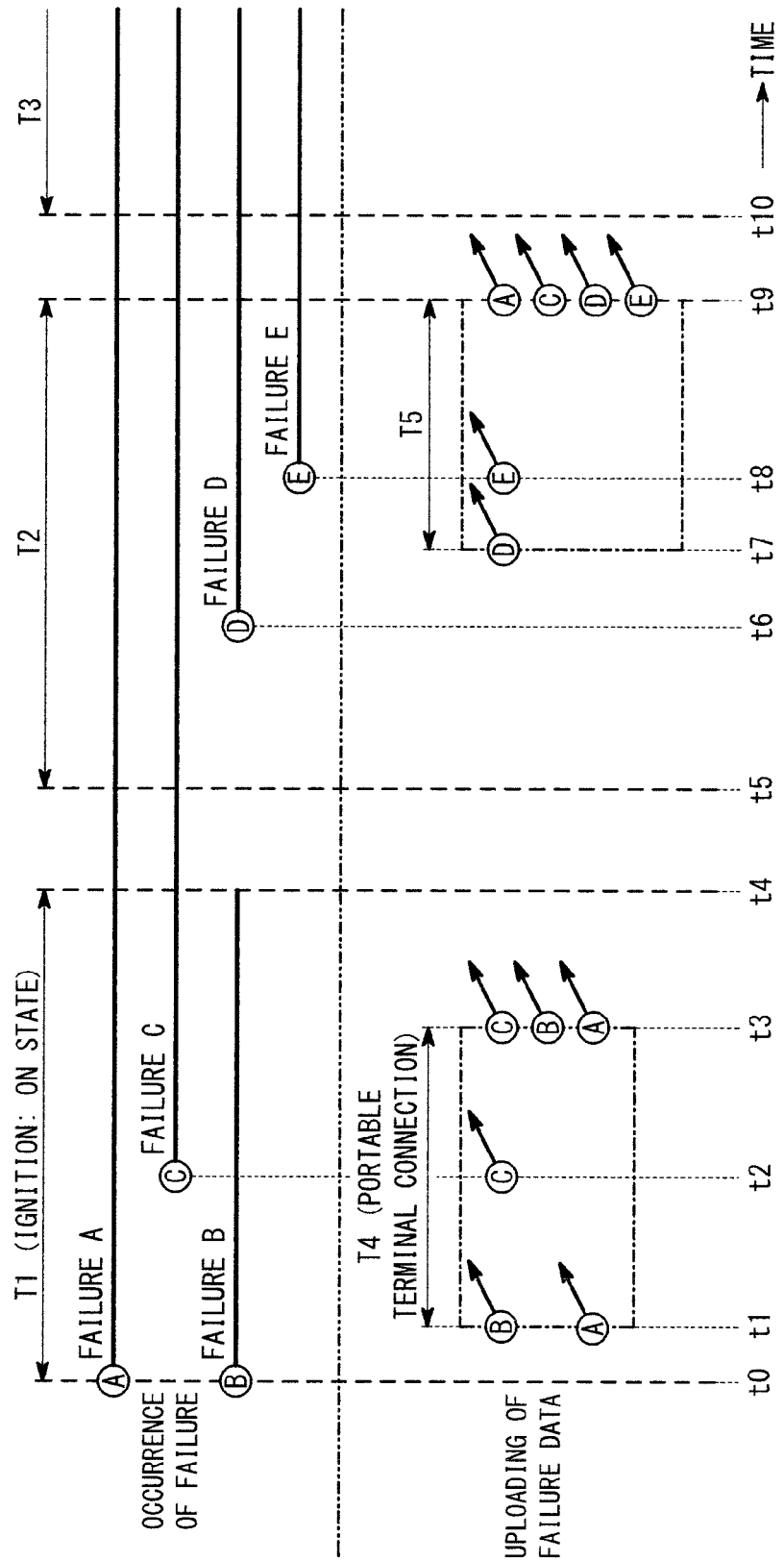
FIG. 5 is a timing chart in which operations of the present embodiment are shown schematically.

FIG. 5 is a timing chart in which there are shown in outline the occurrence of failures and the timing at which failure data is transmitted to the server 16 from the portable terminal 14, in a case in which the portable terminal 14 and the DA device 24 are connected by wireless communications during time periods T4, T5 within time zones (time periods T1 to T3) when the ignition switch of the vehicle 12 is in an on state (i.e., during operation of the engine). In FIG. 5, a case is illustrated in which the driver drives the vehicle 12 a plurality of times (two times), and multiple failures A through E are generated. In this case, descriptions will be made concerning the timing at which failure data is transmitted from the portable terminal 14 to the server 16, whereas concerning the creation of messages by the portable terminal 14 and the server 16, descriptions thereof are omitted.

At time t0, failures A and B are generated when the driver turns on the ignition switch and the engine is started. In this case, the vehicle ECU 46 determines the occurrence of the failures A and B, and the warning lamps 40c are illuminated or undergo flashing corresponding to the concerned failures A and B. Further, the vehicle ECU 46 creates failure data by appending information of the time t0 (a time stamp) to the DTCs responsive to the failures A and B, and outputs such failure data to the DA device 24.

Next, at time t1, by the driver inserting the communications adapter 44 into the DLC 42, the portable terminal 14 and the DA device 24 are connected wirelessly, whereupon the DA device 24 transmits to the portable terminal 14 the failure data responsive to the failures A and B. Consequently, the control unit 68 of the portable terminal 14 transmits (uploads) the failure data of the failures A and B to the server 16 from the wireless communications unit 64 through the wireless communications network 18.

Moreover, the driver may initiate the warning lamp support app 72 by operating the input unit 60 before inserting the communications adapter 44 into the DLC 42, or may initiate the warning lamp support app 72 by operating the input unit 60 after the communications adapter 44 has been inserted into the DLC 42. It is noted that, in the case that the communications adapter 44 is first inserted thereinto, and thereafter the warning lamp support app 72 is initiated, the time at which initiation of the warning lamp support app 72 is completed, is regarded as time t1.

Next, at time t2, in the case that a failure C is newly generated in the vehicle 12, and failure data responsive to the failure C is transmitted to the portable terminal 14 from the DA device 24, the control unit 68 of the portable terminal 14 uploads the failure data of the new failure C to the server 16 from the wireless communications unit 64 through the wireless communications network 18.

Next, at time t3, by the driver taking out the communications adapter 44 from the DLC 42, the wireless connection between the portable terminal 14 and the DA device 24 is severed, whereupon the control unit 68 uploads all of the respective failure data responsive to the failures A through C from the wireless communications unit 64 to the server 16 through the wireless communications network 18. Thereafter, at time t4, the driver turns off the ignition switch and stops the engine.

The interval from time t4 to time t5 is a period during which driving of the vehicle 12 by the driver is suspended, and although it varies depending on the driver, ordinarily this period is from a few hours to a few days.

In addition, in the next driving, when the driver turns on the ignition switch to start the engine at time t5, the vehicle ECU 46 determines the failures that continue to be occurring from driving during the previous time period T1, and the warning lamps 40c are illuminated or undergo flashing responsive to such failures. According to the present embodiment, the occurrence of failures A and C is determined, and the warning lamps 40c are illuminated or undergo flashing corresponding to the concerned failures A and C.

Moreover, at this time, the failure B is eliminated. This indicates that the elimination thereof is one of the following situations. (1) During the period that driving is suspended from time t4 to time t5, the failure B is eliminated due to repairs having been made, or alternatively, (2) in some items of the failure content, the failure state is eliminated by suspending the driving over a time that is greater than or equal to a predetermined time period (for example, in the case that driving is suspended for a predetermined time period with respect to an abnormal rise in the cooling water temperature).

Further, when a new failure D occurs at time t6, the vehicle ECU 46 determines the occurrence of the failure D, and a warning lamp 40c is illuminated or undergoes flashing corresponding to the concerned failure D.

Next, at time t7, when the driver inserts the communications adapter 44 into the DLC 42, the portable terminal 14 and the DA device 24 are connected wirelessly, and the DA device 24 transmits, to the portable terminal 14, failure data including the time information of time t5 and the DTC responsive to the failures A and C that continue to be occurring from the previous driving time, and failure data including the time information of time t6 and the DTC responsive to the new failure D. Consequently, the control unit 68 of the portable terminal 14 can upload the failure data of the new failure D to the server 16 from the wireless communications unit 64 through the wireless communications network 18.

At time t8, a failure E is newly generated in the vehicle 12, the vehicle ECU 46 determines the occurrence of the failure E and causes the warning lamp 40c corresponding to the failure E to be illuminated or undergo flashing, and failure data responsive to the new failure E is transmitted to the portable terminal 14 from the DA device 24. Further, in this case, the control unit 68 uploads the failure data of the new failure E to the server 16 from the wireless communications unit 64 through the wireless communications network 18.

Next, at time t9, when the driver turns the ignition switch off, since supply of power from the battery inside the vehicle 12 to the DA device 24, the vehicle ECU 46, and the sensor unit 50, etc., is suspended, in actual effect, the wireless connection between the portable terminal 14 and the DA device 24 is severed. Consequently, the control unit 68 uploads all of the failure data responsive to failure A and failures C through E from the wireless communications unit 64 to the server 16 through the wireless communications network 18.

Moreover, during the period that driving is suspended from time t9 to time t10, in the case that the failure A and the failures C through E continue, when the engine is started by the driver tuning on the ignition switch at time t10, the vehicle ECU 46 determines the occurrence of the failures A and C through E, and causes the warning lamps 40c to be illuminated or undergo flashing responsive to the failures A and C through E.

FIGS. 6 through 16 are views in which screen displays of the respective display units 28a, 58 are shown, for cases in which one new failure is generated in the vehicle 12, and the communications connection between the portable terminal 14 and the DA device 24 takes place only within the predetermined time period T6.

Figure 6:
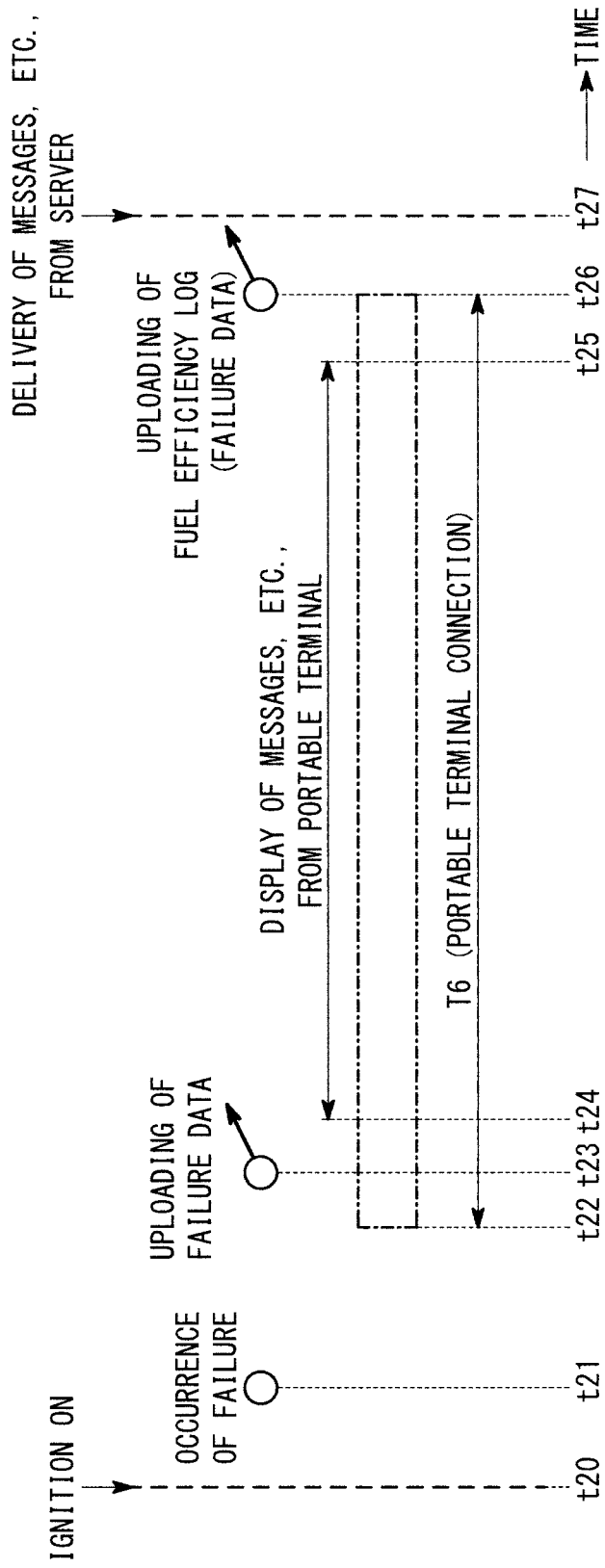
FIG. 6 is a timing chart in which operations of the present embodiment are shown schematically.

At time t20 in FIG. 6, the driver turns on the ignition switch to thereby start the engine, and then at time t21, when a new failure occurs in the vehicle 12, the vehicle ECU 46 determines the occurrence of the new failure, and a warning lamp 40c is illuminated or undergoes flashing corresponding to the concerned failure.

Next, at time t22, by the driver inserting the communications adapter 44 into the DLC 42, the portable terminal 14 and the DA device 24 are connected wirelessly, whereupon the DA device 24 transmits to the portable terminal 14 the failure data responsive to the new failure.

At time t23, the control unit 68 of the portable terminal 14 records, in the failure data storage unit 76, the new failure data that was received, and adds it to the list of the failure DB 78. Further, the control unit 68 uploads the failure data of the new failure to the server 16 from the wireless communications unit 64 through the wireless communications network 18. Furthermore, the control unit 68 searches from within the message DB 80 for a message responsive to the new failure data, and the retrieved message is transmitted to the DA device 24. Then, at time t24, the DA ECU 36 of the DA device 24 displays the received message on the display unit 28a.

More specifically, the DA ECU 36 interrupts the screen (navigation screen) that the display unit 28a ordinarily displays, whereby an interrupt screen 100 (see FIG. 7) including the message is displayed on the display unit 28a.

Moreover, at this time, the message may also be displayed on the display unit 58 of the portable terminal 14. In FIGS. 7 through 13 to be described below, the screen display of the display unit 28a is illustrated, and although it is possible for displays to be made on the display unit 58 of the portable terminal 14, herein, description in relation to the screen displays of the display unit 58 is omitted.

Next, in the present example, a description will be given for a case in which the "FI warning lamp" as a warning lamp 40c corresponding to the occurrence of a new failure is illuminated.

Within a time zone from time t24 to time t25, the control unit 68 creates various messages or the like responsive to the failure data, and the messages can be transmitted to the DA device 24 and displayed as interrupt screens 100 on the display unit 28a.

Figure 7:
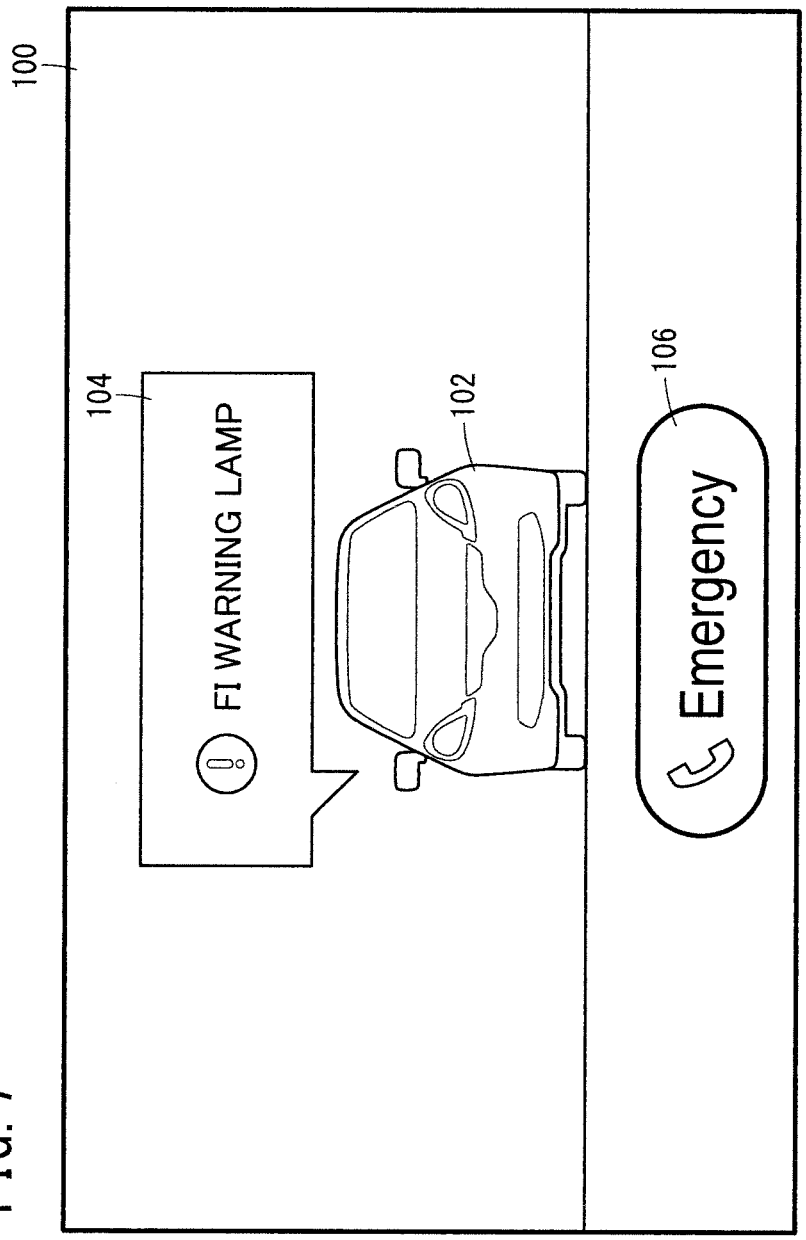
FIG. 7 is an explanatory diagram of an interrupt screen that is displayed on a display unit of the DA device.

In FIG. 7, on the interrupt screen 100, for example, there is displayed, in addition to a vehicle display 102, a name display 104 of the warning lamp 40c that is newly illuminated or flashed, and an emergency contact selection button 106. Further, in the case that plural warning lamps 40c are operated by being illuminated (or undergo flashing), on the interrupt screen 100, the name displays 104 are switched and displayed in an order for which the degree of emergency thereof is highest.

Figure 8:
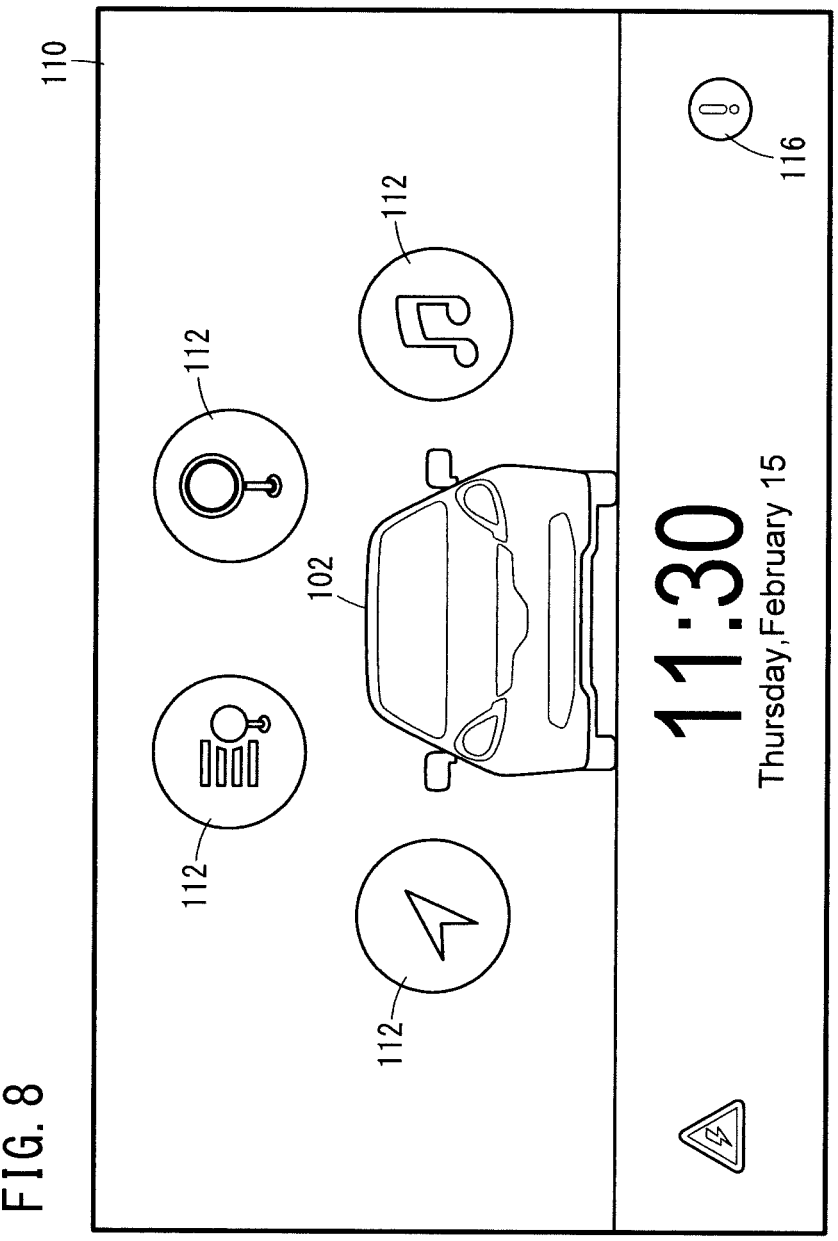
FIG. 8 is an explanatory diagram of a top screen that is displayed on the display unit of the DA device.

Next, on the interrupt screen 100, when the driver makes a touch operation with respect to the vehicle display 102, then instead of the interrupt screen 100, the display unit 28a displays a top screen 110 of FIG. 8. Around the vehicle display 102 of the top screen 110, there are displayed various selection buttons 112 for the purpose of displaying a navigation screen, an audio operation screen, drop pins, etc., and a list screen selection button 116 for the purpose of displaying a list screen 114 of FIG. 9 (a screen in which a list is displayed of the warning lamps 40c that are currently illuminated or undergoing flashing) caused by a touch operation of the driver.

Figure 9:
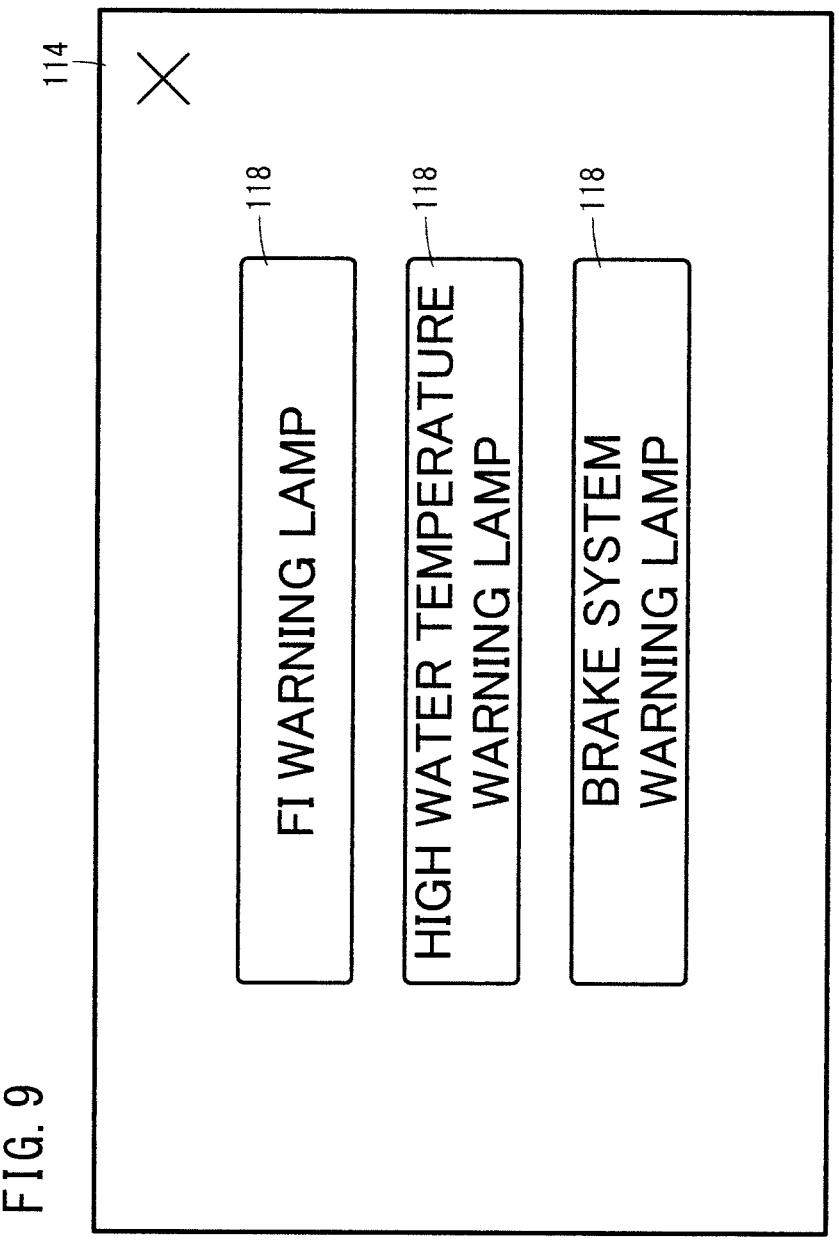
FIG. 9 is an explanatory diagram of a list screen that is displayed on the display unit of the DA device.

In the list screen 114 of FIG. 9, a list is displayed of the warning lamps 40c that are currently illuminated or undergoing flashing. More specifically, the warning lamps 40c that are in an illuminated state or a flashing state are displayed as selection buttons 118. In this case, the selection button 118 for the warning lamp 40c that was newly illuminated or flashed is displayed in the uppermost position.

If there are no other warning lamps 40c that are illuminated or undergoing flashing, only one selection button 118 is displayed corresponding to the one warning lamp 40c that is illuminated or undergoing flashing. Accordingly, in the case of the description corresponding to FIGS. 6 and 7, only one selection button 118 indicative of the "FI warning lamp" is displayed.

Further, although ordinarily, it is rare when a plurality of warning states continue as is (i.e., when a corresponding action such as repairing the fault or the like is not performed), according to the present example, to facilitate description thereof, an example is shown in which the other two warning lamps 40c are left already illuminated or flashing, and continue as is without the warning conditions therefor being resolved and eliminated. Further, in the case that a plurality of displays are carried out in this manner, concerning the displays that are continued, they are displayed according to a preset ordering of highest degree of emergency.

Figure 10:
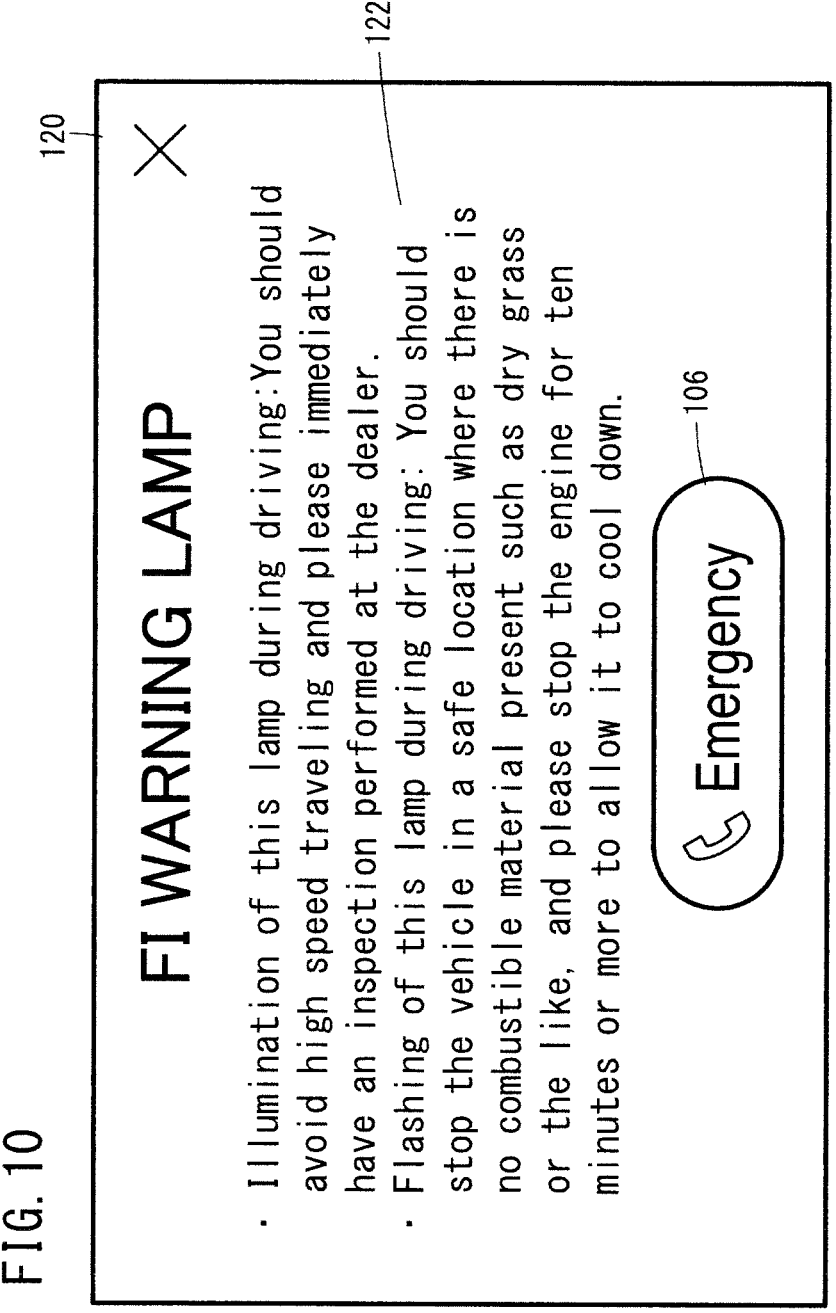
FIG. 10 is an explanatory diagram of a details screen that is displayed on the display unit of the DA device.

When the driver performs a touch operation on the selection button 118 indicative of the newly illuminated "FI warning lamp", a details screen 120 as shown in FIG. 10 is displayed, in which a message corresponding to the "FI warning lamp" is displayed.

More specifically, in the details screen 120 of FIG. 10, a detailed message display 122, and an emergency contact selection button 106 are displayed. Accordingly, by the driver viewing the message display 122, "Illumination of this lamp during driving: You should avoid high speed traveling and please immediately have an inspection performed at the dealer. Flashing of this lamp during driving: You should stop the vehicle in a safe location where there is no combustible material present such as dry grass or the like, and please stop the engine for ten minutes or more to allow it to cool down.", it is possible for an appropriate action to be taken, such as to request the dealer (car dealership) to make repairs to the vehicle 12.

Figure 11:
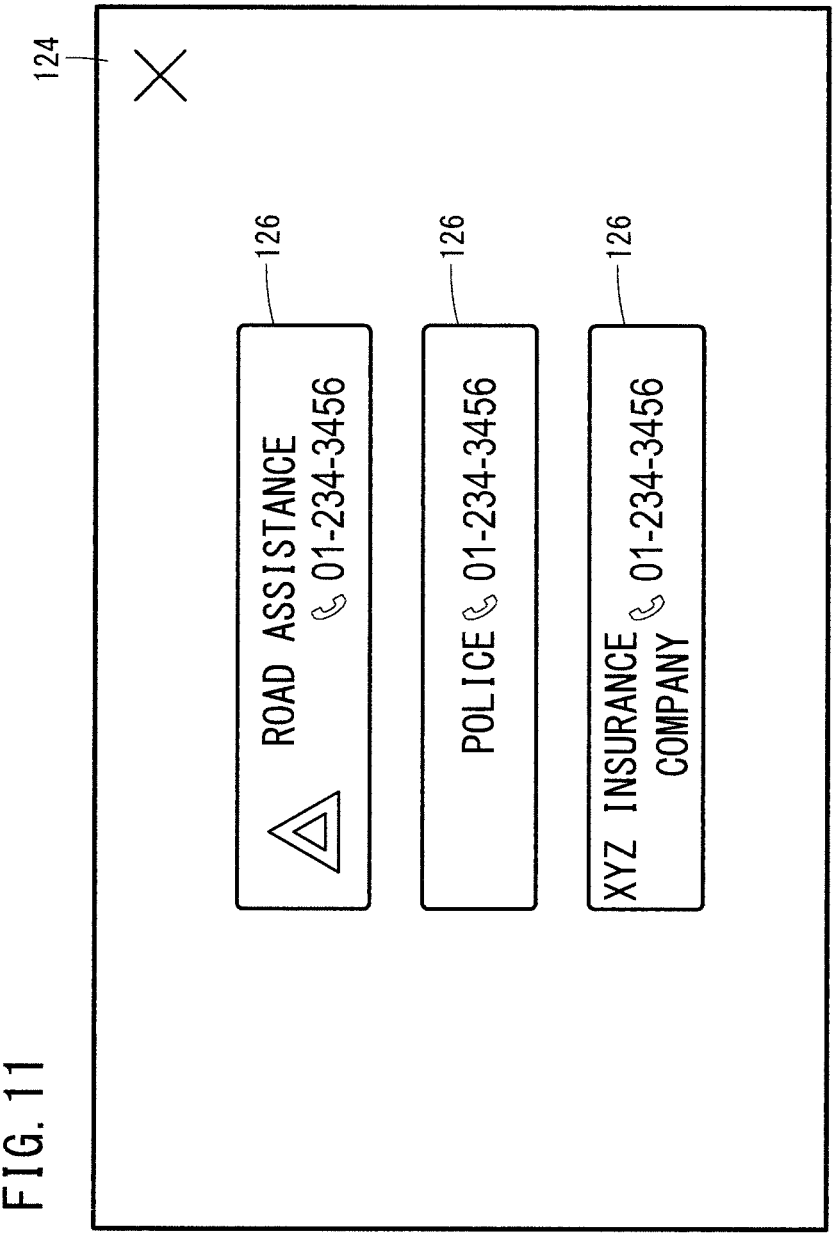
FIG. 11 is an explanatory diagram of an emergency contact screen that is displayed on the display unit of the DA device.

Further, when the driver selects the emergency contact selection button 106, an emergency contact screen 124 as shown in FIG. 11 is displayed. On the emergency contact screen 124, a message display 126 is presented in which there are denoted the telephone numbers of road assistance, the police, and an insurance company, etc. Accordingly, by the driver operating the portable terminal 14 while viewing the message display 126, an appropriate action can be taken by performing an emergency contact to the road assistance, the police, or the insurance company, etc.

Moreover, when the driver performs a touch operation on the name display 104 of the warning lamp 40c of FIG. 7, the details screen 120 of FIG. 10 is displayed on the display unit 28a.

Further, the other message examples will be described based on the list screen 114 of FIG. 9. Displaying of items in the list screen 114 of FIG. 9 indicates that the illuminated state or the flashing state of the warning lamp 40c therefor has not been eliminated.

Figure 12:
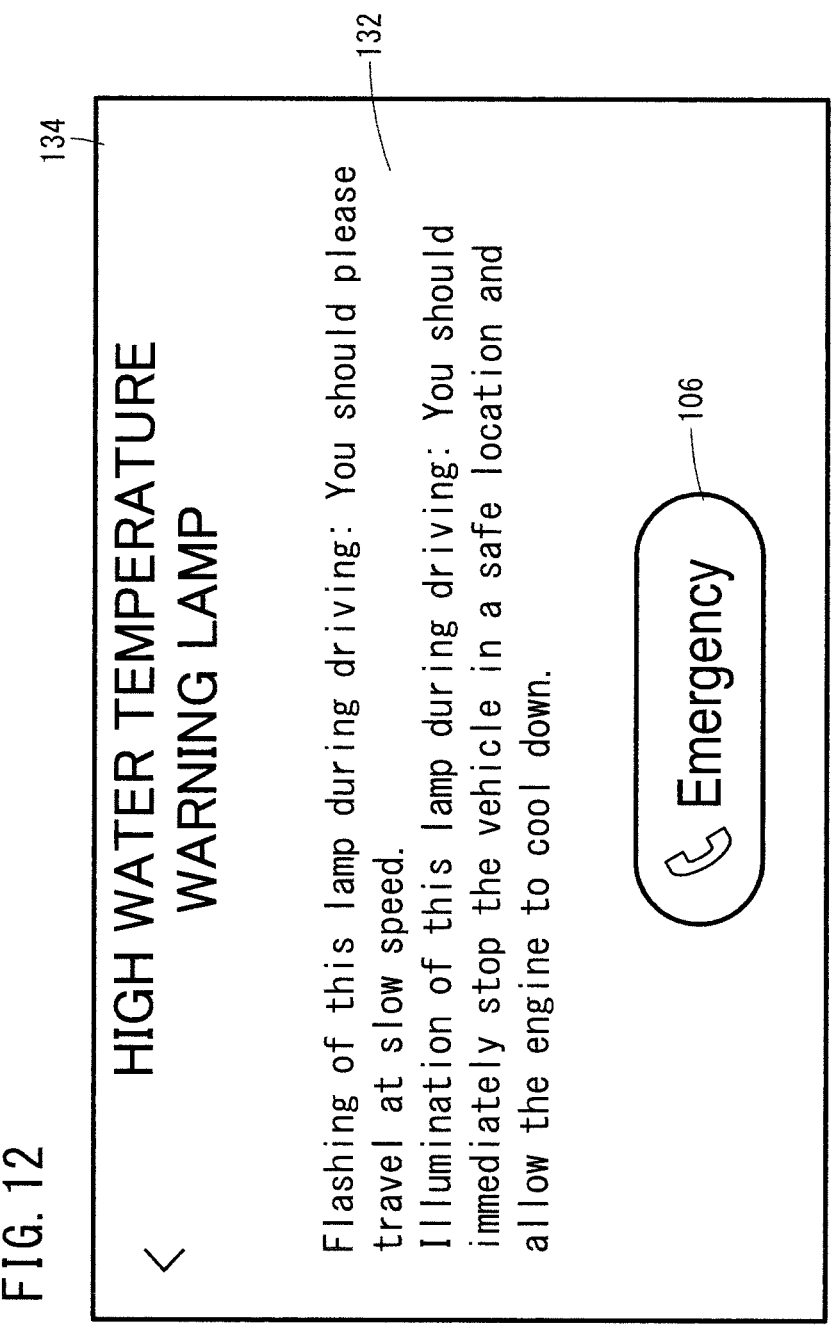
FIG. 12 is an explanatory diagram of another details screen that is displayed on the display unit of the DA device.

In the list screen 114 of FIG. 9, when the driver performs a touch operation on the selection button 118 indicative of the "high water temperature warning lamp", then as shown in FIG. 12, another details screen 134 is displayed, in which there are displayed a message display 132 corresponding to the "high water temperature warning lamp", and the emergency contact selection button 106. Accordingly, by the driver viewing the message display 128, "Flashing of this lamp during driving: You should please travel at slow speed. Illumination of this lamp during driving: You should immediately stop the vehicle in a safe location and allow the engine to cool down.", an appropriate action can be taken.

When the driver performs a touch operation on the selection button 118 indicative of the "brake system warning lamp", then as shown in FIG. 13, another details screen 130 is displayed, in which there are displayed a message display 128 corresponding to the "brake system warning lamp", and the emergency contact selection button 106. Accordingly, by the driver viewing the message display 128, "Illumination of this lamp during driving implies that you should please immediately have an inspection performed at the dealer. Further, even if illuminated, the performance of the normal braking function is preserved. When the City Brake Active indicator lamp is illuminated simultaneously, the City Brake Active System is failing and cannot be operated. Please have an inspection performed at the dealer.", it is possible for an appropriate action to be taken, such as to request the dealer to make repairs to the vehicle 12.

The City Brake Active System is a system by which automatic braking is operated, in the case it is detected that there is a possibility for the vehicle 12 to collide with a vehicle in front, whereby a collision with the vehicle in front is avoided or mitigated. Further, in the case there is an obstacle in front, the City Brake Active System prevents the driver from suddenly accelerating the vehicle 12 by pressing on the accelerator pedal. Accordingly, in the event that the warning lamp 40c corresponding to the City Brake Active System is illuminated or undergoes flashing, a situation results in which the City Brake Active System is not operating.

Thereafter, at time t26, when the communications connection between the portable terminal 14 and the DA device 24 is interrupted, the control unit 68 uploads the first-time failure data of the "FI warning lamp" that was newly illuminated, the respective failure data of the "brake system warning lamp" and the "high water temperature water lamp" that continue to be illuminated or undergo flashing, and the fuel efficiency data (fuel efficiency log data) of the vehicle 12 to the server 16 from the wireless communications unit 64 through the wireless communications network 18.

Next, a description will be given concerning a notification (reminder message) given to the driver or the like from the server 16 to prompt the driver or the like to take action, in the case that the illuminated state or the flashing state of the warning lamp 40c has not been canceled even though a predetermined time period has elapsed, and more specifically, in the case that an action has not been taken to repair the failure. The predetermined time period can be set appropriately. However, according to the present embodiment, the predetermined time period is set to seven days as a guideline.

At time t27, in the case that the abnormality content indicated by the uploaded failure data is received even though the predetermined time period from first reception of the same failure data has elapsed, the control unit 84 of the server 16 searches from within the message DB 90 for the relevant message, and transmits the concerned message to the portable terminal 14 from the wireless communications unit 82 through the wireless communications network 18. The control unit 68 of the portable terminal 14 displays, on the display unit 58, the message that was downloaded from the server 16.

Figure 14:
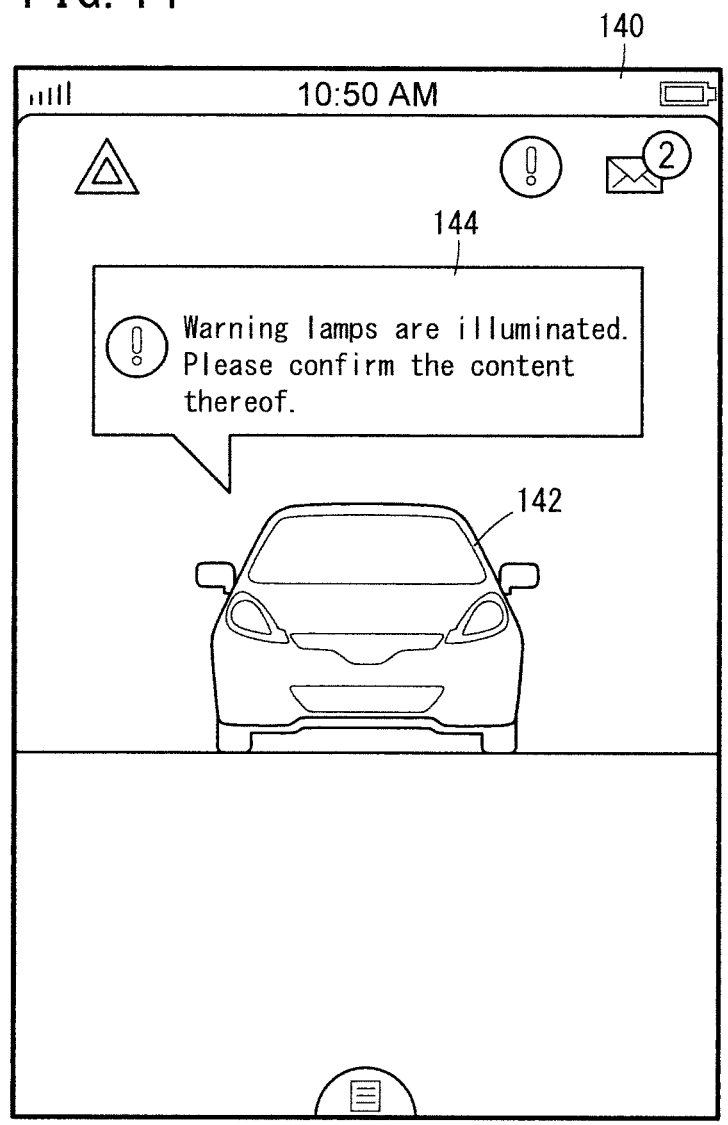
FIG. 14 is an explanatory diagram of a top screen that is displayed on a display unit of the portable terminal.
Figure 15:
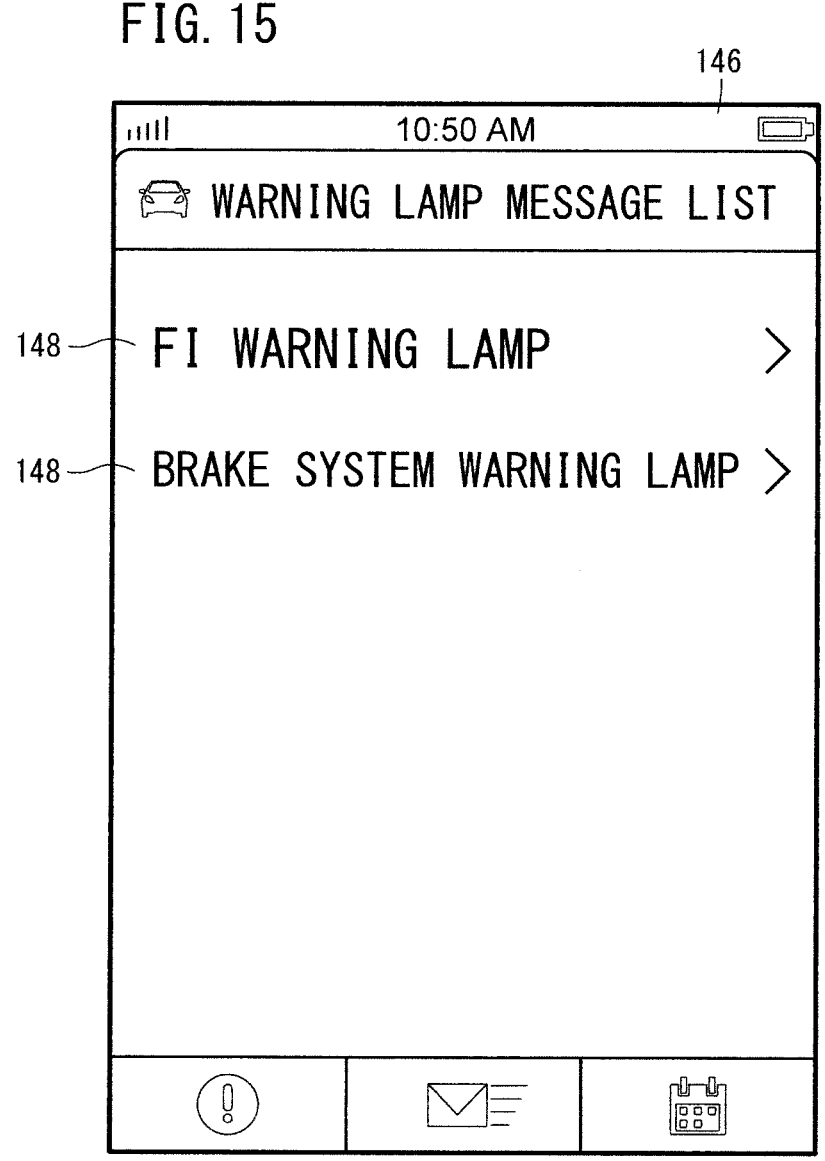
FIG. 15 is an explanatory diagram of a list screen that is displayed on the display unit of the portable terminal.
Figure 16:
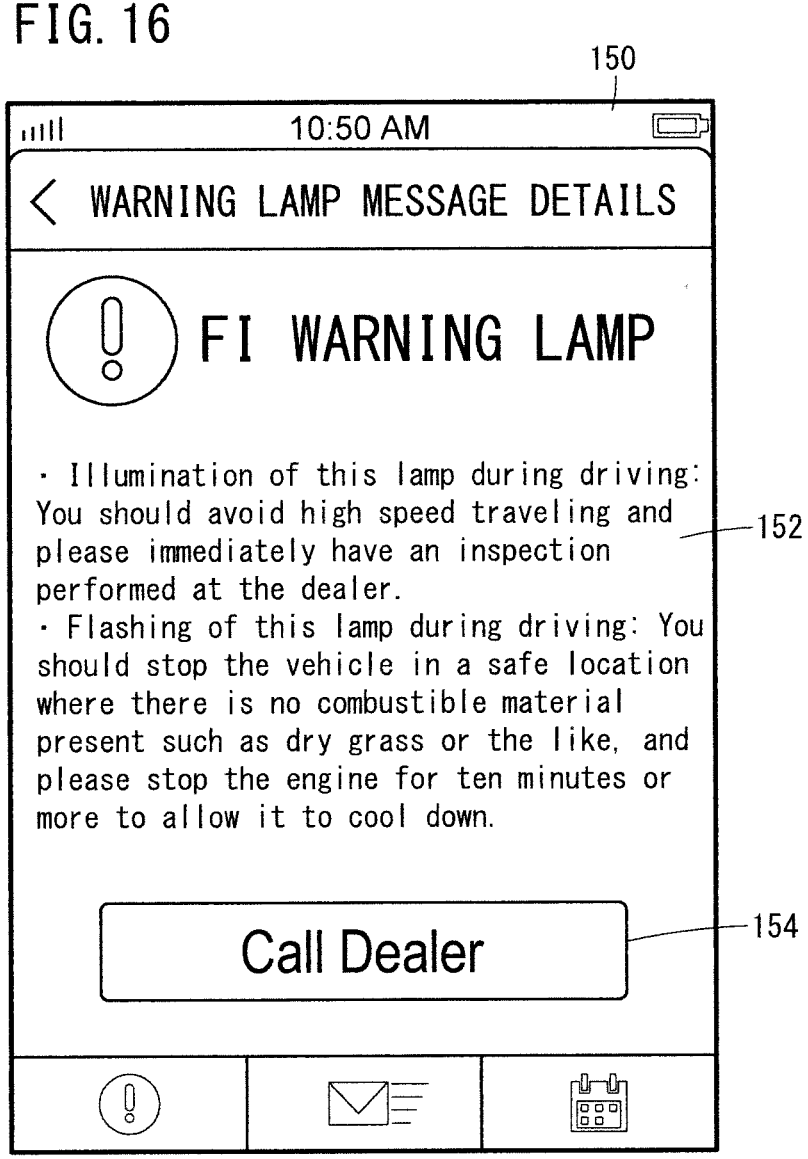
FIG. 16 is an explanatory diagram of a details screen that is displayed on the display unit of the portable terminal.

FIGS. 14 through 16 show various screens that correspond to messages that are displayed on the display unit 58 of the portable terminal 14.

In a top screen 140 shown in FIG. 14, there is displayed, for example, together with a vehicle display 142, a message display 144 to prompt the driver to confirm the content of the warning lamps 40c that currently continue to be illuminated. When the driver performs a touch operation with respect to the message display 144, the display switches to a list screen 146 shown in FIG. 15 (a screen on which a list is displayed of warning lamps 40c that continue to be currently illuminated or undergo flashing for seven days or more).

In the list screen 146, concerning the warning lamps 40c that continue to be illuminated or undergo flashing for seven days or more, plural selection displays 148, which enable messages to be selected corresponding to those warning lamps 40c, are displayed. Although ordinarily, it is rare when multiple warning states continue as is (i.e., when a corresponding action such as repairing the fault or the like is not performed), according to the present example, to facilitate description thereof, an example is shown in which two warning lamps 40*c* continue with the warning states thereof left as is.

When the driver performs a touch operation with respect to the selection display 148 for the "FI warning lamp" from among the selection displays 148, the display switches to a details screen 150 shown in FIG. 16, and a message display 152 indicating the detailed message content is displayed. Consequently, by the driver viewing the message display 152, which serves as a reminder, it can easily be reconfirmed what kind of action should be taken with respect to the FI warning lamp that is illuminated or flashing.

Moreover, an emergency contact selection button 154 is displayed on the details screen 150 of FIG. 16. When the driver performs a touch operation with respect to the emergency contact selection button 154, similar to the case of FIG. 11, the contact information for the dealer is displayed (illustration thereof is omitted).

The individual operations of the DA device 24, the portable terminal 14, and the server 16, and the screen displays of the respective display units 28*a*, 58 that correspond to such operations are as described above.

Based on the descriptions given above, next, descriptions will be made with reference to FIGS. 17 and 18 concerning overall operations of the monitoring system 10 including the DA device 24, the portable terminal 14, and the server 16.

In step S1 of FIG. 17, when the driver connects the portable terminal 14 to the DA device 24, the control unit 68 of the portable terminal 14 determines whether or not failure data and fuel efficiency data have been received from the DA device 24 (step S2). More specifically, by the control unit 68 determining the presence or absence of reception of the failure data and the fuel efficiency data, it is determined whether or not the ignition switch is already turned on, and in the event it is not turned on, the procedure waits until the ignition switch is turned on. In other words, in step S2, based on the driver turning on the ignition switch, it is determined whether or not the DA device 24 and other components on the side of the vehicle 12 are being driven.

If the failure data and the fuel efficiency data are capable of being received (step S2: YES), then in the next step S3, the control unit 68 stores the received failure data in the failure data storage unit 76, and it is determined whether or not the failure data represents failure data (first time failure data) for which corresponding warning lamps 40*c* have been illuminated or flashed for the first time.

In the case of first time failure data (step S3: YES), then in the next step S4, the control unit 68 records the first time failure data in the failure DB 78, and searches from within the message DB 80 for a message responsive to the first time failure data. In addition, the control unit 68 transmits the retrieved message to the DA device 24, and instead of the normal navigation screen, the message is displayed as an interrupt screen 100 on the display unit 28*a* (step S5).

Next, in step S6, the control unit 68 uploads the first time failure data from the wireless communications unit 64 to the server 16 through the wireless communications network 18.

Thereafter, in step S7, the control unit 68 monitors the illumination or flashing of the warning lamps 40*c* (monitors the reception of failure data from the DA device 24), and in the case that failure data and fuel efficiency data are received from the DA device 24 (step S8: NO), and if the concerned failure data is new failure data (step S9: YES), the processes of steps S4 through S6 are carried out. Further, if the received data is failure data that is continuously received (step S9: NO), step S7 is returned to, and illumination or flashing of the warning lamps 40*c* continues to be monitored.

In addition, in the case that reception of the failure data and the fuel efficiency data from the DA device 24 is interrupted (step S8: YES), then in step S10, the control unit 68 uploads all of the failure data and the fuel efficiency data to the server 16 from the wireless communications unit 64 through the wireless communications network 18.

On the other hand, in FIG. 18, in the server 16, in the case that wireless communications with the portable terminal 14 are established through the wireless communications network 18 (step S21), the control unit 84 stores in the failure data storage unit 86 the failure data that was received by the wireless communications unit 82, and it is determined whether or not the failure data is first time failure data (step S22).

If it is first time failure data (step S22: YES), the control unit 84 adds the concerned failure data to the failure DB 88 (step S23). On the other hand, in the case it is not first time failure data (step S22: NO), the control unit 84 determines whether or not all of the failure data and the fuel efficiency data have been received from the portable terminal 14 (step S24). If all of the failure data and the fuel efficiency data have not been received (step S24: NO), the control unit 84 executes the process again from step S22.

On the other hand, if all of the failure data and the fuel efficiency data have been received (step S24: YES), then in the next step S25, the control unit 84 checks the list of the failure DB 88 with all of the received failure data, and determines whether or not failure data that matches with the received failure data is recorded in the list.

In addition, in the following step S26, the control unit 84 compares the time information included in the first time failure data that exists in the list, and the time information of the received failure data, and determines whether or not the time indicated by the received failure data has exceeded a predetermined time period from the time indicated by the first time failure data.

If it remains inside of the predetermined time period (step S26: NO), the control unit 84 determines that the failure has been eliminated, or that the failure has not yet led to such a situation that repair of the failure needs to be notified, and in the next step S27, all of the information that is stored in the failure data storage unit 86 is erased, together with updating the list of the failure DB 88.

On the other hand, in step S26, in the case it is judged that the predetermined time period has elapsed (step S26: YES), the control unit 84 determines that there is a need to notify the repair of the failure, and in the next step S28, a relevant message therefor is retrieved from the message DB 90. In addition, the control unit 84 transmits the retrieved message to the portable terminal 14 from the wireless communications unit 82 through the wireless communications network 18 (step S29). Accordingly, the control unit 68 of the portable terminal 14 can display, on the display unit 58, the message that is received by the wireless communications unit 64, and can notify the repair of the failure of the vehicle 12 to the driver. Moreover, after the process of step S29, the control unit 84 implements the process of step S27.

Advantages of the Present Embodiment

As described above, in accordance with the monitoring system 10 and the portable terminal 14 according to the present embodiment, in the case that a warning lamp 40*c* of the meter panel 40 is illuminated or undergoes flashing in accordance with the occurrence of an abnormal state of failure or poor maintenance of the vehicle 12, the DA device 24 transmits failure data indicative of the occurrence of the abnormal state such as a new failure or the like to the server 16 through the portable terminal 14 such as a smart phone or the like. Consequently, the server 16 can be notified rapidly of the occurrence of a new failure, and the occurrence of the new failure can easily be managed. Further, by searching from within the message DB 80, the portable terminal 14 generates a message corresponding to the abnormal state of the vehicle 12 responsive to the illumination or flashing of the warning lamp 40c, and the message can be displayed on the display unit 28a of the DA device 24 inside the vehicle 12.

In this manner, according to the present embodiment, when a warning lamp 40c is newly illuminated or undergoes flashing, since the portable terminal 14 that is connected to the DA device 24 creates a message responsive to the abnormality content (failure data) and displays the message on the display unit 28a of the DA device 24, the communications time with the server 16 (time to access the server 16) can be reduced. Further, by displaying the message responsive to the abnormality content on the display unit 28a of the DA device 24, it is possible to provide a notification of the concerned message quickly to the driver, even in the event that the vehicle 12 resides at a position outside of the communications range with respect to the server 16.

Further, in this case, if the warning lamp 40c is newly illuminated or undergoes flashing when the DA device 24 and the portable terminal 14 are not connected, then at a timing at which the portable terminal 14 is connected to the DA device 24, and receives failure data indicative of the warning lamp 40c undergoing new illumination or flashing, the portable terminal 14 may transmit, to the server 16, the failure data responsive to the new illumination or flashing, while on the other hand, may create a message corresponding to the failure data, transmit the message to the DA device 24, and cause the message to be displayed on the display unit 28a of the DA device 24.

In accordance with this feature, during driving of the vehicle 12, at whatever timing the driver connects the portable terminal 14 to the DA device 24, with respect to the occurrence of an abnormality condition responsive to a new illumination or flashing of the warning lamp 40c that has occurred during driving in an unconnected condition, at a timing at which the connection between the DA device 24 and the portable terminal 14 is confirmed, the failure data responsive to the illumination or flashing can be transmitted to the server 16 through the portable terminal 14 from the DA device 24, and a message corresponding to the failure data can be notified to the driver.

Furthermore, at a point in time when it is detected that reception of the failure data from the DA device 24 has been interrupted, for example, at a timing at which the ignition switch is turned off, or at a timing at which the connection (communications connection) between the DA device 24 and the portable terminal 14 is severed, the portable terminal 14 transmits, to the server 16, all of the detected failure data (failure data pertaining to all of the warning lamps 40c that are illuminated or flashing).

By this feature, since the server 16 receives all of the failure data from the portable terminal 14, it can easily be managed whether or not the abnormal condition of the same failure or the like is continuing to occur. On the other hand, it is possible to reduce the frequency with which the portable terminal 14 uploads the failure data to the server 16. For example, upon driving of the vehicle 12 one time (i.e., during each of the driving cycles of time periods T1 to T3 of FIG. 5), the portable terminal 14 only has to carry out, with respect to the server 16, one time uploading (uploading of all of the failure data) at a point in time that reception of the failure data is interrupted, and uploading for each time that a new failure is generated.

In this manner, with the present embodiment, even if the connection between the DA device 24 and the portable terminal 14 is severed before the ignition switch is turned off, since the portable terminal 14 transmits to the server 16 all of the failure data at the timing that such severing takes place, the abnormal state of the vehicle 12 at that point in time can be uploaded reliably to the server 16. Consequently, in the case that the portable terminal such as a smart phone or the like that is carried on a daily basis by the driver, for example, is carried into the vehicle 12 from the outside and is used as the portable terminal 14 of the monitoring system 10, even if connection or disconnection thereof with respect to the DA device 24 in the interior of the vehicle 12 is carried out at an arbitrary timing (for example, the communications adapter 44, or the USB connection cord or the like is attached or detached by the driver), the abnormal state of the vehicle can be uploaded reliably to the server 16 without any problems.

Further, since there is no need for the failure data to be retained in the portable terminal 14 after transmission thereof, the data stored in the failure data storage unit 76 can be erased, the data to be retained in the portable terminal 14 can be held to a minimum, and it is possible to conserve the memory capacity.

Furthermore, according to the present embodiment, determining whether or not the notification of the abnormality content (receipt of the failure data) responsive to a new illumination or flashing continues for a predetermined time period is managed on the side of the server 16, and when reception of the failure data is continued even though the predetermined time period has elapsed, the message created by the server 16 (i.e., the message retrieved from the message DB 90) is displayed on the display units 28a, 58, whereby the driver is prompted to repair the failure. As a result, a time period, which is of a degree that does not put the driver to annoyance, can be adjusted easily responsive to the abnormality content.

In this manner, according to the present embodiment, in the case that a warning lamp 40c is illuminated or undergoes flashing in accordance with the occurrence of an abnormal state of the vehicle 12, the portable terminal 14 such as a smart phone or the like, which is capable of being connected to the DA device 24 mounted in the vehicle 12, is used to create a message corresponding to the abnormality content of the vehicle 12 and further to carry out notification of the message with respect to the DA device 24 inside the vehicle 12 and notification of the abnormality content with respect to a server 16, whereby the time required for accessing the server 16 can be reduced. Further, even if the vehicle 12 resides at a position outside of the communications range with respect to the server 16, it is possible for the message of the abnormality content responsive to the illumination or flashing of the warning lamp 40c to be notified quickly to the driver.

Modifications of the Present Embodiment

The present invention is not limited to the embodiment described above, and various configurations can be adopted therein without deviating from the essential scope of the present invention.

More specifically, in the above description, although a case has been described in which messages responsive to the illumination or flashing of the warning lamps 40*c* are generated by the portable terminal 14 or the server 16, and are displayed on the display units 28*a*, 58, in addition to or instead of the screen displays, the messages may be notified to the driver by voice from the speakers 32, 62.

Further, concerning the warning lamps 40*c* as well, in addition to the aforementioned FI warning lamp FI, the high water temperature warning lamp, and the brake system warning lamp, if necessary, other warning lamps can be illuminated or made to flash, and messages can be created appropriately corresponding to the other warning lamps that are illuminated or undergo flashing.

Moreover, for the respective warning lamps 40*c* to be illuminated or undergo flashing, as a prerequisite therefor, it is a matter of course that it is necessary for the vehicle ECU 46 to detect an abnormal condition such as a failure or the like of the vehicle 12, based on the detection results in the various sensor units 50.

The invention claimed is:

1. A vehicle state monitoring system comprising:
   a display device that is mounted in a vehicle;
   a portable terminal device configured to connect to the display device; and
   a server configured to connect to the display device through the portable terminal device,
   wherein when an illuminated state or a flashing state of a warning lamp provided in the vehicle is monitored, and the warning lamp is illuminated or undergoes flashing corresponding to an abnormal state that has occurred in the vehicle, when the display device and the portable terminal device are connected, the display device transmits monitoring data to the portable terminal device, wherein the monitoring data is indicative of a monitoring result corresponding to the warning lamp, and
   wherein when it is detected that the received monitoring data is indicative of the monitoring result of a new illumination or flashing of the warning lamp, the portable terminal device creates a message corresponding to an abnormality content of the vehicle responsive to the new illumination or flashing, notifies the display device of the message corresponding to the abnormality content of the vehicle, and causes the message to be displayed on the display device, while also notifying the server of the abnormality content that is of concern.

2. The vehicle state monitoring system according to claim 1, wherein when the warning lamp is newly illuminated or undergoes flashing when the display device and the portable terminal device are not connected, then at a timing at which the portable terminal device is connected to the display device, and receives monitoring data indicative of the new illumination or flashing of the warning lamp, the portable terminal device notifies the server of the abnormality content responsive to the new illumination or flashing, while the portable terminal device also creates a message corresponding to the abnormality content, notifies the display device of the message, and causes the message to be displayed on the display device.

3. The vehicle state monitoring system according to claim 1, wherein when it is detected that reception of the monitoring data has been interrupted, the portable terminal device notifies the server of the abnormality content responsive to all of the monitoring data received at a point in time at which the interruption was detected.

4. The vehicle state monitoring system according to claim 1,
   wherein when the abnormality content is notified to the server even though a predetermined time period has elapsed from notification of the abnormality content responsive to the new illumination or flashing, the server transmits, to the portable terminal device, a signal to prompt repair of a failure of the vehicle responsive to the abnormality content, and
   wherein the portable terminal device, based on the signal received thereby, displays a message to prompt repair of the failure of the vehicle on at least one of a display unit of the portable terminal device, and the display device that is in a connected state.

5. The vehicle state monitoring system according to claim 1, wherein the server is not directly connected to the display device that is mounted on the vehicle.

6. A portable terminal device, which is capable connecting to a display device that is mounted in a vehicle, and a server,
   wherein when a warning lamp provided in the vehicle is illuminated or undergoes flashing corresponding to an abnormal state that has occurred in the vehicle, and the display device connected to the portable terminal device transmits monitoring data to the portable terminal device indicative of a monitoring result corresponding to the warning lamp, and
   wherein when it is detected that the received monitoring data is indicative of the monitoring result of a new illumination or flashing of the warning lamp, the portable terminal device creates a message corresponding to an abnormality content of the vehicle responsive to the new illumination or flashing, notifies the display device of the message corresponding to the abnormality content of the vehicle, and causes the message to be displayed on the display device, while also notifying the server of the abnormality content that is of concern.

7. The portable terminal device according to claim 6, wherein when it is detected that reception of the monitoring data has been interrupted, the portable terminal device notifies the server of the abnormality content responsive to all of the monitoring data received at a point in time in which the interruption was detected.

8. The portable terminal device according to claim 6, wherein the server is not directly connected to the display device that is mounted on the vehicle.

* * * * *